(12) United States Patent
Balutkar et al.

(10) Patent No.: US 11,936,800 B1
(45) Date of Patent: Mar. 19, 2024

(54) CASE SYSTEM FOR PORTABLE ELECTRONIC DEVICE

(71) Applicant: Pioneer Square Brands, Inc., High Point, NC (US)

(72) Inventors: Vrushank Deepak Balutkar, Jamestown, NC (US); Riley Edwin Lynch, Greensboro, NC (US); Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/503,164

(22) Filed: Nov. 6, 2023

Related U.S. Application Data

(63) Continuation-in-part of application No. 18/493,714, filed on Oct. 24, 2023.

(51) Int. Cl.
*H04M 1/02* (2006.01)
*H04B 1/3816* (2015.01)
*H04B 1/3827* (2015.01)
*H04B 1/3888* (2015.01)

(52) U.S. Cl.
CPC .......... *H04M 1/026* (2013.01); *H04B 1/3888* (2013.01)

(58) Field of Classification Search
CPC .... H04M 1/02; H04M 1/0202; H04M 1/0249; H04M 1/0252; H04M 1/026; H04M 1/0283; H04M 1/03; H04M 1/04; H04M 1/21; H04B 1/385; H04B 1/3888; H04B 1/38; H04B 1/3816; H04B 1/3818; H04B 1/3827; H04B 1/3833; G06F 1/1628; G06F 1/1656

See application file for complete search history.

(56) References Cited

U.S. PATENT DOCUMENTS

| | | | | |
|---|---|---|---|---|
| 5,532,466 | A * | 7/1996 | Konno | G06K 7/006 439/55 |
| 9,838,520 | B2 * | 12/2017 | Goodman | H04M 1/21 |
| 10,320,101 | B2 * | 6/2019 | Brogan | H04M 1/0266 |
| 10,397,460 | B2 * | 8/2019 | Gantz | H04B 1/3888 |

FOREIGN PATENT DOCUMENTS

WO WO-2015099502 A1 * 7/2015 ........... H04B 1/3888

* cited by examiner

*Primary Examiner* — Quochien B Vuong
(74) *Attorney, Agent, or Firm* — Grandview Law

(57) ABSTRACT

A case system includes first and second electrical connector assemblies coupled to an exterior side of a recess of a base of a rear assembly. The recess is couplable to a card reader so that the card reader when in a first position electrically couples to the first electrical connector assembly and when in a second position is oriented 180 degrees from the first position to electrically couple to the second electrical connector assembly. Other aspects are described in the claims, drawings, and text forming a part of the present disclosure.

19 Claims, 61 Drawing Sheets

US 11,936,800 B1

CASE SYSTEM FOR PORTABLE ELECTRONIC DEVICE

SUMMARY

In one or more aspects a case system for a portable electronic device includes (I) a front assembly including (A) a first side, (B) a second side, (C) a third side, (D) a fourth side, and (E) a base extending perpendicular to and extending between the first side, the second side, the third side, and the fourth side, wherein at least a portion of the first side extends parallel to at least a portion of the second side, wherein at least a portion of the third side extends parallel to at least a portion of the fourth side, and wherein at least the portion of the first side extends perpendicular to the at least a portion of the third side; (II) a rear assembly coupled to the front assembly, the rear assembly including (A) a first side, (B) a second side, (C) a third side, (D) a fourth side, and (E) a base extending perpendicular to and extending between the first side, the second side, the third side, and the fourth side, wherein the base includes an interior side facing the front assembly and an exterior side facing away from the front assembly, wherein at least a portion of the first side extends parallel to at least a portion of the second side, wherein at least a portion of the third side extends parallel to at least a portion of the fourth side, and wherein at least the portion of the first side extends perpendicular to the at least a portion of the third side; (III) a first electrical connector assembly coupled with the base of the rear assembly, wherein the first electrical connector assembly includes a first plurality of electrical contacts positioned in a spatial arrangement, wherein the first plurality of electrical contacts is accessible from the exterior side of the base of the rear assembly, wherein the first plurality of electrical contacts includes an electrical contact nearest to the at least a portion of the first side of the rear assembly, wherein the electrical contact of the first plurality of electrical contacts nearest to the at least a portion of the first side of the rear assembly is spaced from the at least a portion of the first side of the rear assembly a first distance, wherein the first plurality of electrical contacts includes an electrical contact nearest to the at least a portion of the second side of the rear assembly, wherein the electrical contact of the first plurality of electrical contacts nearest to the at least a portion of the second side of the rear assembly is spaced from the at least a portion of the second side a second distance; and (IV) a second electrical connector assembly coupled with the base of the rear assembly, wherein the second electrical connector assembly includes a second plurality of electrical contacts positioned in a spatial arrangement, wherein the second plurality of electrical contacts is accessible from the exterior side of the base of the rear assembly, wherein the second plurality of electrical contacts includes an electrical contact nearest to the at least a portion of the first side of the rear assembly, wherein the electrical contact of the second plurality of electrical contacts nearest to the at least a portion of the first side of the rear assembly is spaced from the at least a portion of the first side of the rear assembly a first distance, wherein the second plurality of electrical contacts includes an electrical contact nearest to the at least a portion of the second side of the rear assembly, wherein the electrical contact of the second plurality of electrical contacts nearest to the at least a portion of the second side of the rear assembly is spaced from the at least a portion of the second side of the rear assembly a second distance, wherein in the first distance of the first electrical connector assembly is equal to the first distance of the second electrical connector assembly, wherein the second distance of the first electrical connector assembly is equal to the second distance of the second electrical connector assembly, and wherein the spatial arrangement of the second electrical connector assembly is a duplicate of the spatial arrangement of the first electrical connector assembly. Further including a third electrical connector assembly, wherein the rear assembly and the front assembly couple to form an opening sized to couple with the third electrical connector assembly. Wherein the base of the rear assembly includes a first aperture to receive the first electrical connector assembly, wherein a portion of the first electrical connector assembly protrudes through the first aperture from the interior side of the base to the exterior side of the base thereby providing accessibility to the plurality of electrical contacts of the first electrical connector assembly from the exterior side of the base, wherein the base of the rear assembly includes a second aperture to receive the second electrical connector assembly, and wherein a portion of the second electrical connector assembly protrudes through the second aperture from the interior side of the base to the exterior side of the base thereby providing accessibility to the plurality of electrical contacts of the second electrical connector assembly from the exterior side of the base. Wherein the exterior side of the base of the rear assembly includes a recess. Wherein the recess includes a base and a depth, wherein the exterior side of the base of the rear assembly includes a first portion and a second portion extending in parallel with respect to one another and differing in elevation by a first elevational difference, wherein the base of the recess is the first portion of the exterior side of the base, wherein the first elevational difference is the depth of the recess, and wherein the base of the recess includes the first aperture and the second aperture. Wherein the recess includes a first side, wherein the recess includes a second side, wherein the first side and the second side of the recess extend parallel with respect to one another, wherein the first aperture and the second aperture of the base of the rear assembly are equally spaced from the first side of the recess, and wherein the first aperture and the second aperture of the base of the rear assembly are equally spaced from the second side of the recess. Wherein the rear assembly includes a metal plate, wherein the metal plate is coupled to the base of the rear assembly, wherein the base of the recess includes a third aperture, and wherein a portion of the metal plate protrudes through the third aperture from the interior side of the base of the rear assembly to the base of the recess thereby providing accessibility to the metal plate from the exterior side of the base of the rear assembly. Wherein the third aperture of the base of the recess includes a first side and a second side extending parallel with one another, wherein the first plurality of electrical contacts of the first electrical connector assembly includes an electrical contact nearest to the first side of the third aperture, wherein the electrical contact of the first plurality of electrical contacts of the first electrical connector assembly nearest to the first side of the third aperture is spaced from the first side of the recess a first distance, wherein the second plurality of electrical contacts of the second electrical connector assembly includes an electrical contact nearest to the second side of the third aperture, and wherein the electrical contact of the second plurality of electrical contacts of the second electrical connector assembly nearest to the second side of the third aperture is spaced from the second side of the third aperture a second distance equal to the first distance. Wherein the recess includes at least one first lip protrusion extending from the first side of the recess, and wherein the recess includes at least one second lip protrusion extending from the second side of the recess. Further including a card reader including a base and at least one slot, wherein the card reader is couplable with the at least one first lip protrusion and the at least one second lip protrusion of the recess, wherein the at least one slot of the card reader extends in parallel with respect to the base of the card reader, wherein the at least one slot of the card reader is positioned a first elevational distance from base of the card reader, and wherein the depth of the recess of the rear assembly is equal to the first elevational distance. Further including an adapter sized and shaped to engage the at least one of lip protrusion extending from the first side of the recess and to engage the at least one of lip protrusion extending from the second side of the recess. Further including a card reader wherein the adapter is sized and shaped to couple with the card reader. Wherein the card reader includes a base and at least one slot, wherein the adapter includes a base positioned a first elevational distance from the at least one slot of the card reader when the adapter is coupled with the card reader, and wherein the depth of the recess of the rear assembly is equal to the first elevational distance. Wherein the card reader is electrically coupled with the first electrical connector assembly when the card reader is coupled to the rear assembly in a first position, wherein the card reader is electrically coupled with the second electrical connector assembly when the card reader is coupled to the rear assembly in a second position, and wherein the carder reader is rotationally oriented in the second position 180 degrees from the first position.

In one or more aspects a case including for a portable electronic device including (I) a front assembly; (II) a rear assembly coupled to the front assembly, the rear assembly including (A) a base including an edge, an interior side facing the front assembly and an exterior side facing away from the front assembly; (III) a first electrical connector assembly coupled with the base of the rear assembly, wherein the first electrical connector assembly includes a first plurality of electrical contacts positioned in a spatial arrangement, and wherein the first plurality of electrical contacts is accessible from the exterior side of the base; and (IV) a second electrical connector assembly coupled with the base of the rear assembly, wherein the second electrical connector assembly includes a second plurality of electrical contacts positioned in a spatial arrangement, wherein the second plurality of electrical contacts is accessible from the exterior side of the base, wherein the spatial arrangement of the second electrical connector assembly is a duplicate of the spatial arrangement of the first electrical connector assembly, and wherein the first electrical connector assembly and the second electrical connector assembly are spaced from the edge of the base a first distance. Wherein the exterior side of the base of the rear assembly includes a recess, wherein the rear assembly includes a metal plate coupled to the base of the rear assembly and accessible from the exterior side of the base of the rear assembly, and wherein from the exterior side of the base of the rear assembly the first electrical connector assembly and the second electrical connector assembly are equally spaced from opposite sides of the metal plate. Further including a card reader including a base and at least one slot, wherein the card reader is couplable with the recess, wherein the at least one slot of the card reader extends in parallel with respect to the base of the card reader, wherein the at least one slot of the card reader is positioned a first elevational distance from base of the card reader, and wherein the depth of the recess of the rear assembly is equal to the first elevational distance.

In one or more aspects a case including for a portable electronic device including (I) a rear assembly including (A) a base including an edge and an exterior side; (II) a first electrical connector assembly coupled with the base of the rear assembly and accessible from the exterior side of the base; and (III) a second electrical connector assembly coupled with the base of the rear assembly and accessible from the exterior side of the base, and wherein the first electrical connector assembly and the second electrical connector assembly are spaced from the edge of the base a first distance. Further including a card reader and an adapter, wherein the adapter is sized and shaped to couple with the card reader, wherein the exterior side of the base of the rear assembly includes a recess, wherein the adapter is sized and shaped to couple with the recess having a depth, wherein the card reader includes a base and at least one slot, wherein the adapter includes a base positioned a first elevational distance from the at least one slot of the card reader when the adapter is coupled with the card reader, and wherein the depth of the recess of the rear assembly is equal to the first elevational distance. further including a card reader couplable to the rear assembly, wherein the card reader is electrically coupled with the first electrical connector assembly when the card reader is coupled to the rear assembly in a first position, wherein the card reader is electrically coupled with the second electrical connector assembly when the card reader is coupled to the rear assembly in a second position, and wherein the carder reader is rotationally oriented in the second position 180 degrees from the first position.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Case System for Portable Electronic Device, articles of manufacture, compositions of matter for same that may provide context, for instance, in introducing one or more processes and/or devices described herein.

DETAILED DESCRIPTION

Figure 1:
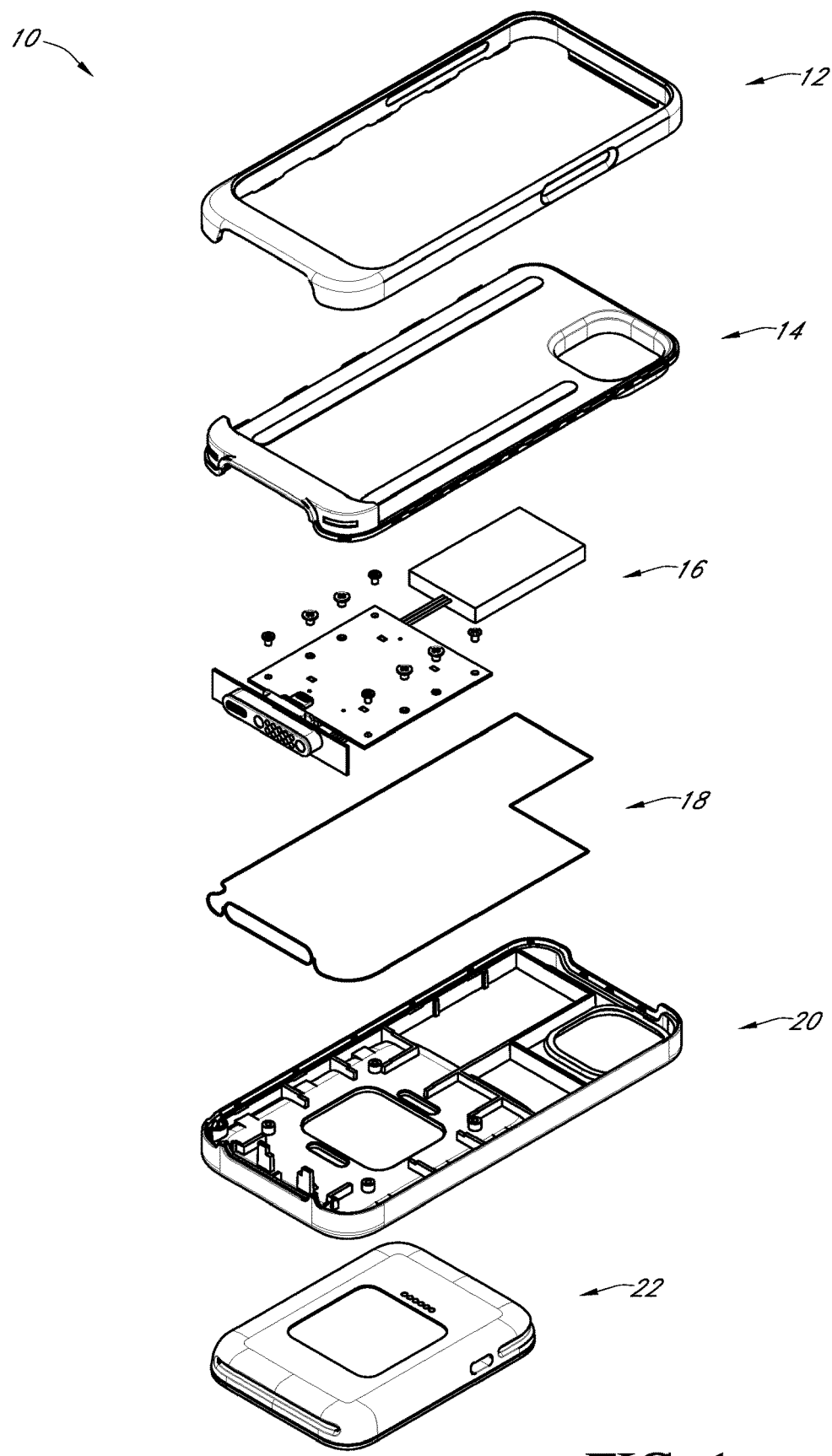
FIG. 1 is an exploded top perspective view of case system.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded top perspective view of case system 10. Depicted implementation of case system 10 is shown to include bezel assembly 12, front assembly 14, electronics assembly 16, gasket member 18, rear assembly 20, and card reader 22.

Figure 2:
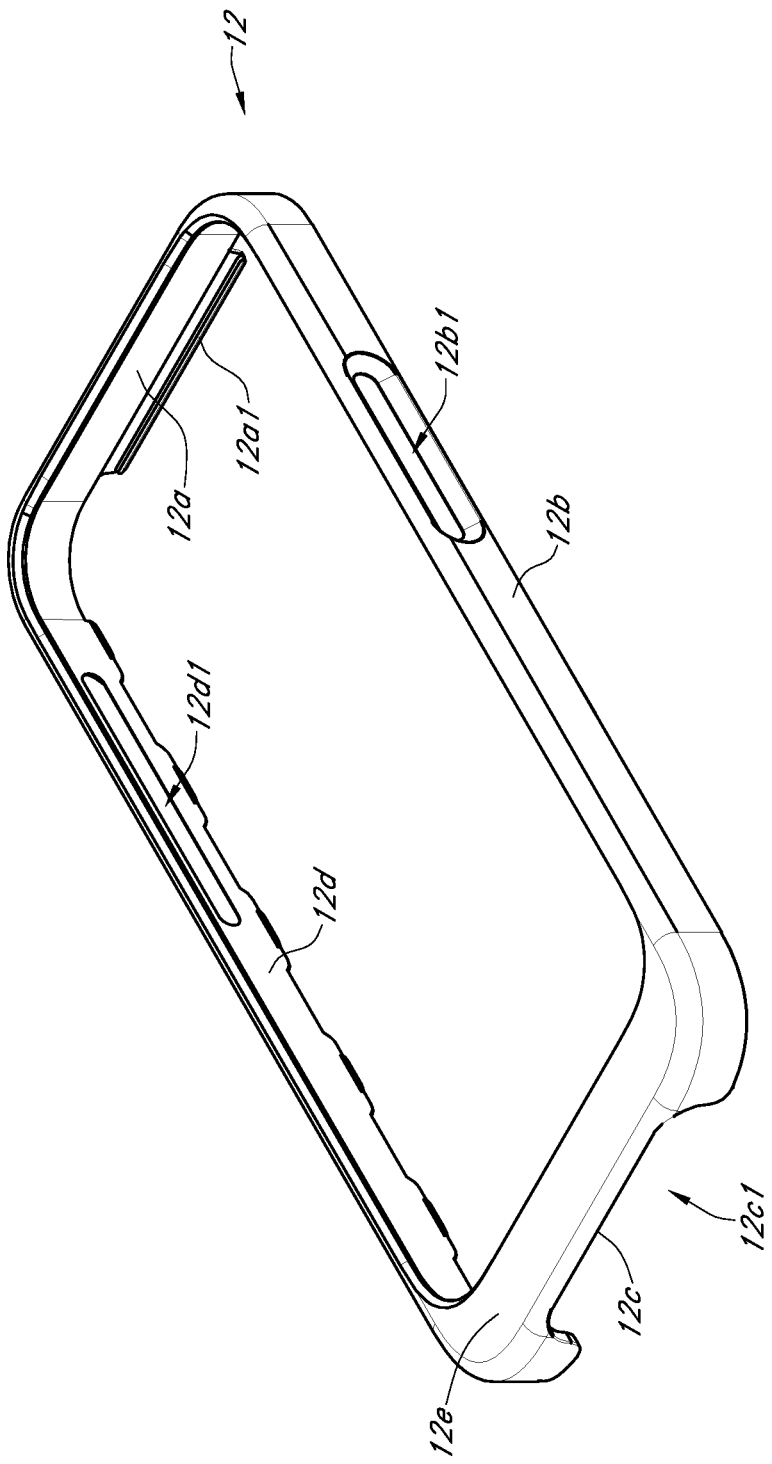
FIG. 2 is a top perspective view of bezel assembly of case system.

Turning to FIG. 2, depicted therein is a top perspective view of bezel assembly 12 of case system 10. Depicted implementation of bezel assembly 12 is shown to include side 12a with catch 12a1, side 12b with aperture 12b1, side 12c with cutout feature 12c1, side 12d with aperture 12d1, and front 12e.

Figure 3:
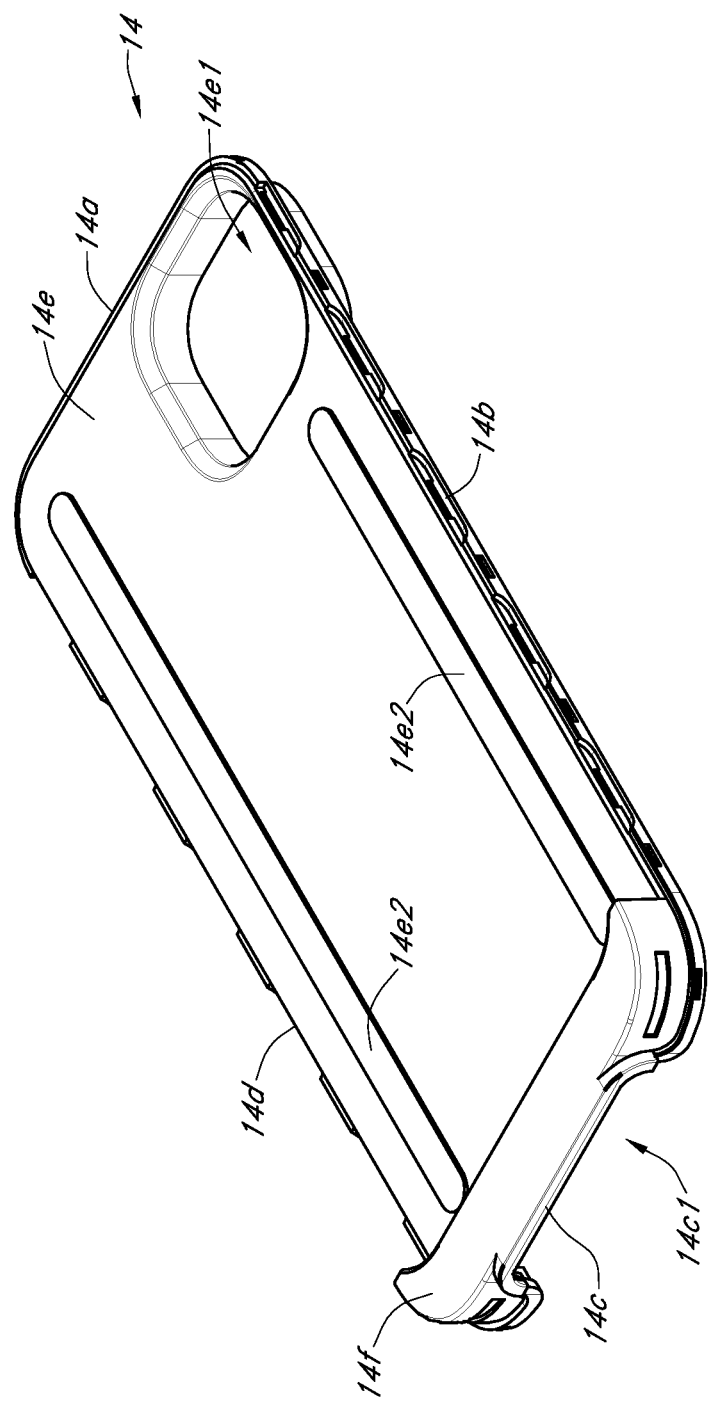
FIG. 3 is a top perspective view of front assembly of case system.

Turning to FIG. 3, depicted therein is a top perspective view of front assembly 14 of case system 10. Depicted implementation of front assembly 14 is shown to include side 14a, side 14b, side 14c with cutout feature 14c1, side 14d, base 14e with aperture 14e1 and strip 14e2, and front 14f. As depicted, side 14a, side 14b, and side 14d include snap-fit engagement members to engage with snap-fit engagement members of rear assembly 20.

Figure 4:
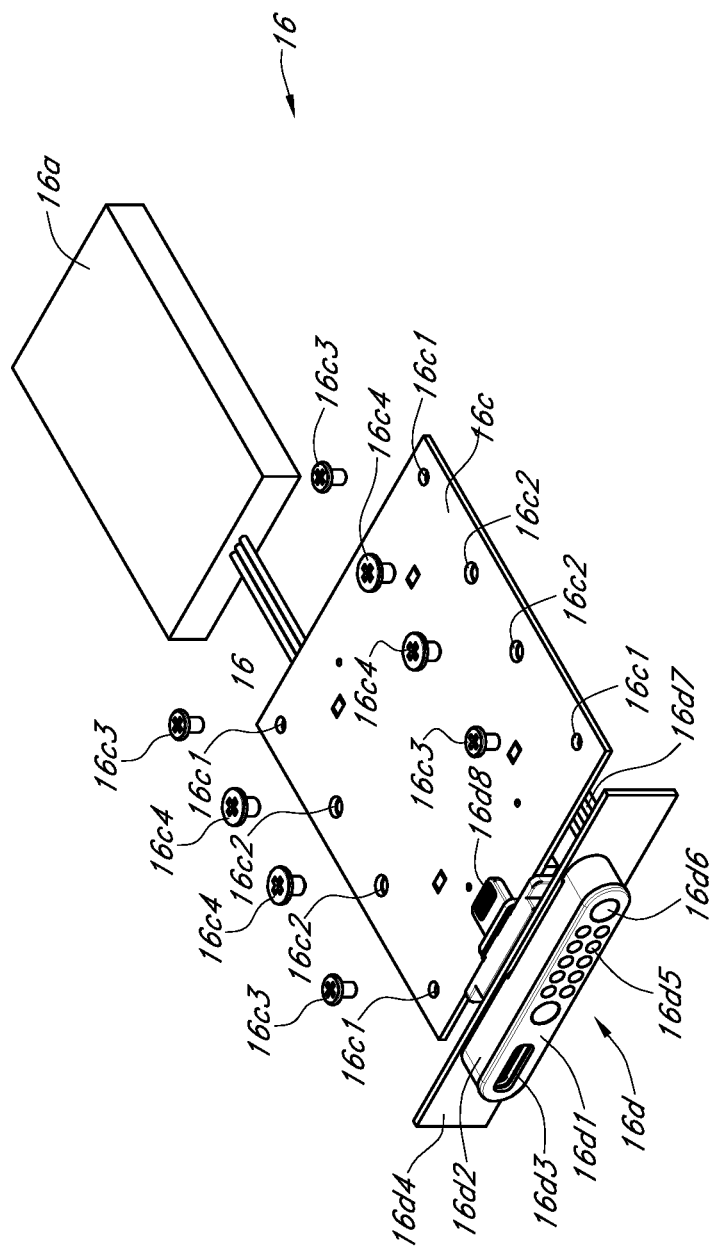
FIG. 4 is a top perspective view of electronics assembly of case system.

Turning to FIG. 4, depicted therein is a top perspective view of electronics assembly 16 of case system 10. Depicted implementation of electronics assembly 16 is shown to include battery assembly 16a, electrical cabling 16b, circuit board 16c with first aperture 16c1, second aperture 16c2, first fastener 16c3, and second fastener 16c4. Depicted implementation of electronics assembly 16 is shown to include electrical connector assembly 16d with connector 16d1, circumference portion 16d2, port portion 16d3, plate 16d4, contact 16d5, and contact 16d6, and electrical cabling 16d7.

Figure 5:
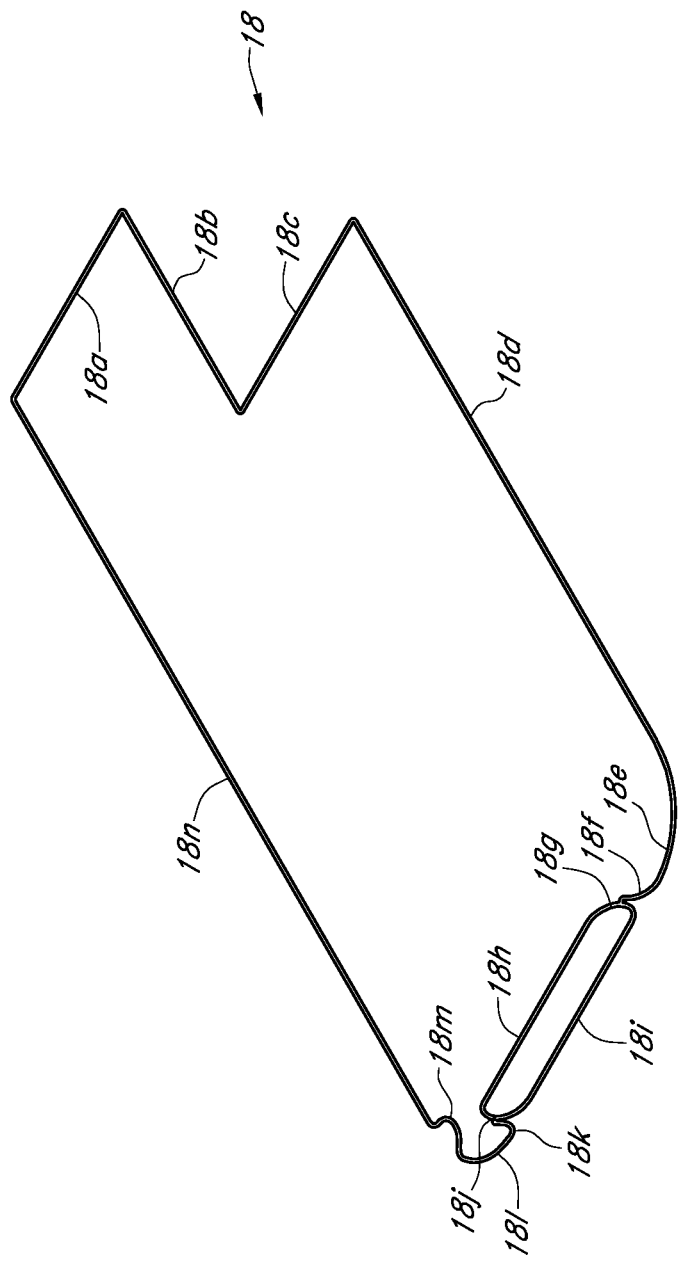
FIG. 5 is a top perspective view of gasket member of case system.

Turning to FIG. 5, depicted therein is a top perspective view of gasket member 18 of case system 10. Depicted implementation of gasket member 18 is shown to include linear portion 18a, linear portion 18b, linear portion 18c, linear portion 18d, curvilinear portion 18e, curivilinear portion 18f, curvilinear portion 18g, linear portion 18h, linear portion 18i, curvilinear portion 18j, curvilinear portion 18k, curvilinear portion 18l, curvilinear portion 18m, and linear portion 18n. As depicted, gasket member 18 can be made from one or more of the following materials: closed-cell sponge rubber, open-cell sponge rubber, and foam material.

Figure 6:
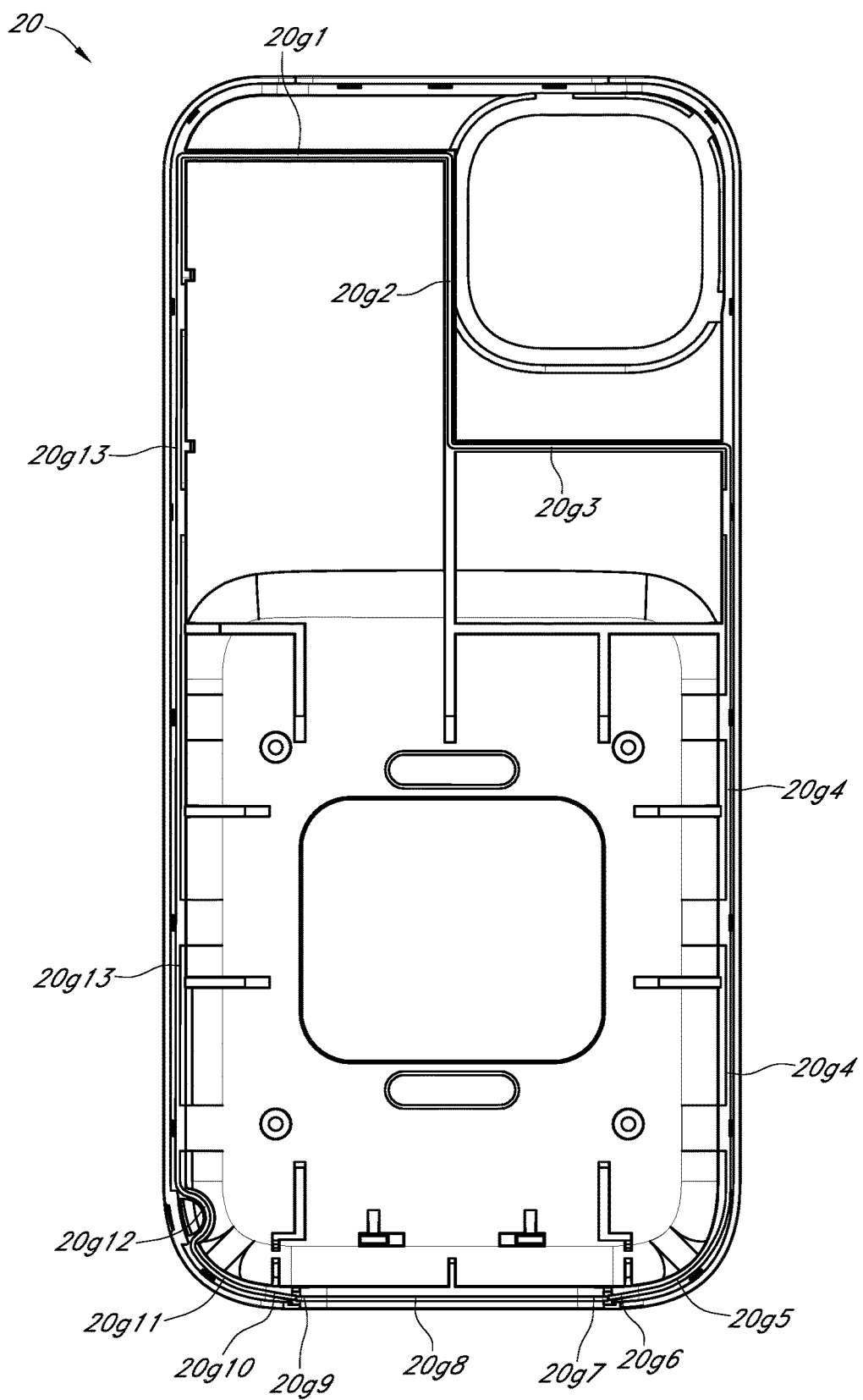
FIG. 6 is a top perspective view of rear assembly of case system.

Turning to FIG. 6, depicted therein is a top perspective view of rear assembly 20 of case system 10. Depicted implementation of rear assembly 20 is shown to include channel portion 20g1, channel portion 20g2, channel portion 20g3, channel portion 20g4, channel portion 20g5, channel portion 20g6, channel portion 20g7, channel portion 20g8, channel portion 20g9, channel portion 20g10, channel portion 20g11, channel portion 20g12, and channel portion 20g13.

Figure 7:
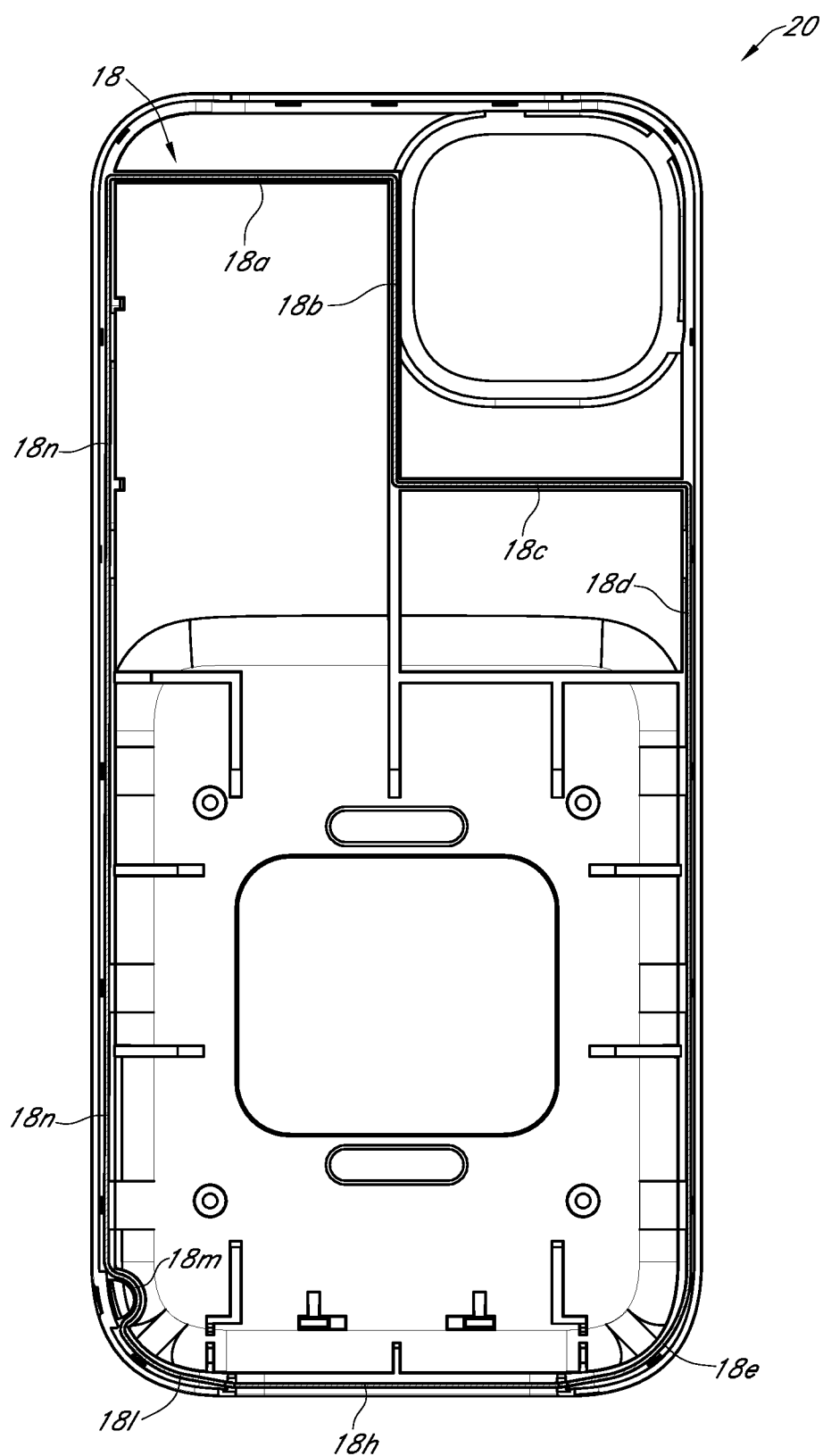
FIG. 7 is a top plan view of rear assembly of case system.

Turning to FIG. 7, depicted therein is a top plan view of rear assembly 20 coupled with gasket member 18 of case system 10.

Figure 8:
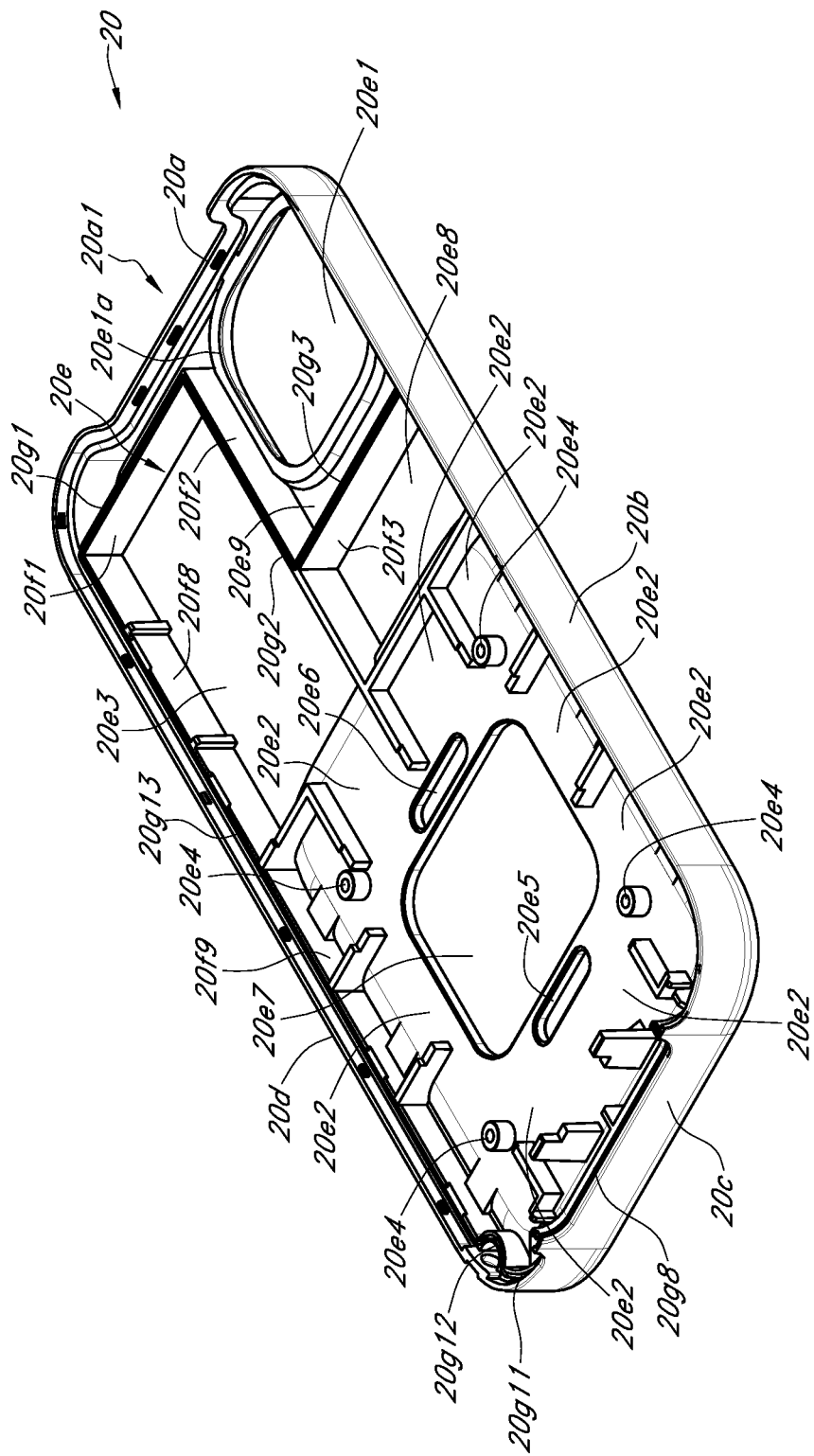
FIG. 8 is a top perspective view of rear assembly of case system.

Turning to FIG. 8, depicted therein is a top perspective view of rear assembly 20 of case system 10. Depicted implementation of rear assembly 20 is shown to include side 20a with cutout feature 20a1, side 20b, side 20c, side 20d, base interior 20e with aperture 20e1 with rim portion 20e1a, base portion 20e2, base portion 20e3, fastener receiver 20e4, connector aperture 20e5, connector aperture 20e6, plate aperture 20e7, base portion 20e8, and base portion 20e9. Depicted implementation of rear assembly 20 is shown to include interior wall 20f1, interior wall 20f2, interior wall 20f3, interior wall 20f8, and interior wall 20f9 that in part define walled portions or walled compartments. As depicted, side 20a, side 20b, and side 20d include snap-fit engagement members to engage with snap-fit engagement members of front assembly 14. As depicted, portions of base interior 20e such as base portion 20e2 can be coated with one or more epoxy sealant layers.

Figure 9:
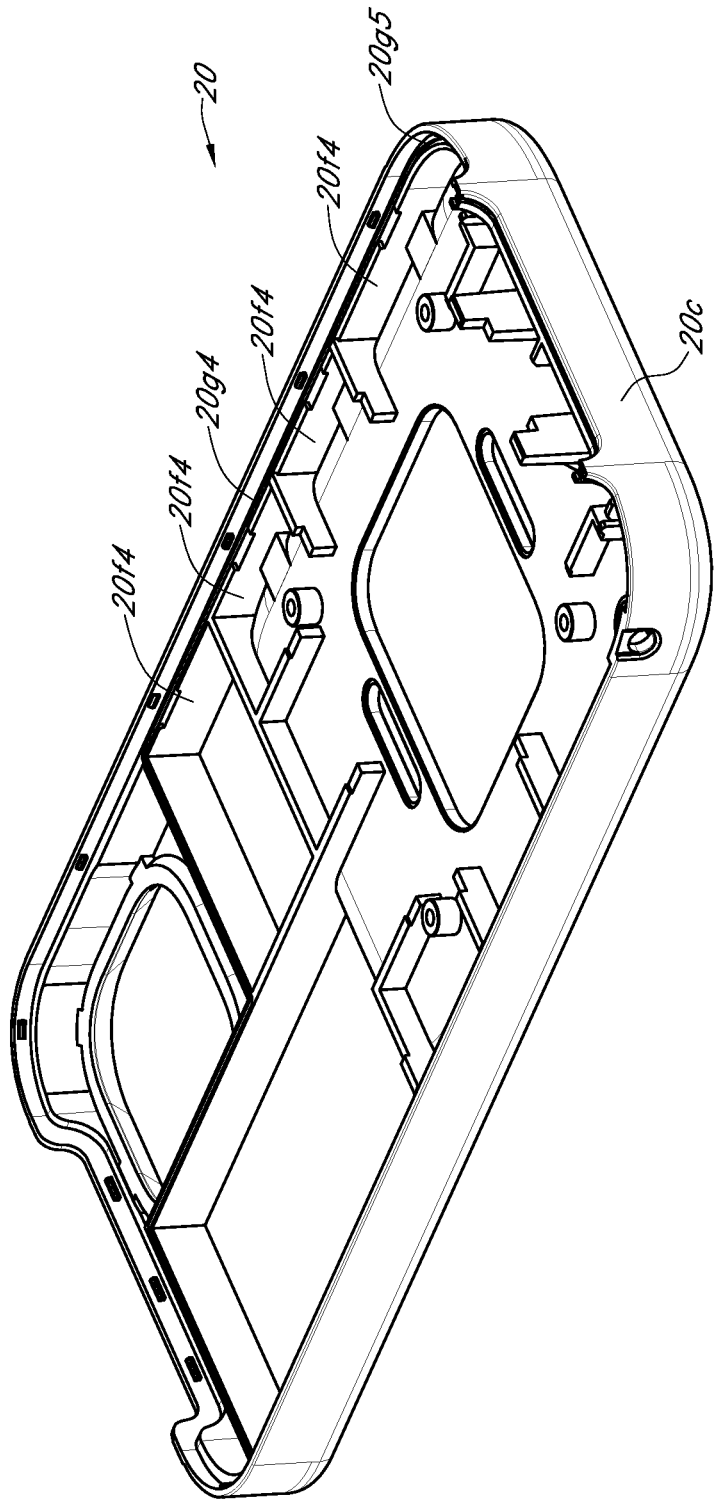
FIG. 9 is a top perspective view of rear assembly of case system.

Turning to FIG. 9, depicted therein is a top perspective view of rear assembly 20 of case system 10. Depicted implementation of rear assembly 20 is shown to include interior wall 20f4, which helps to define a walled portion or walled compartment.

Figure 9A:
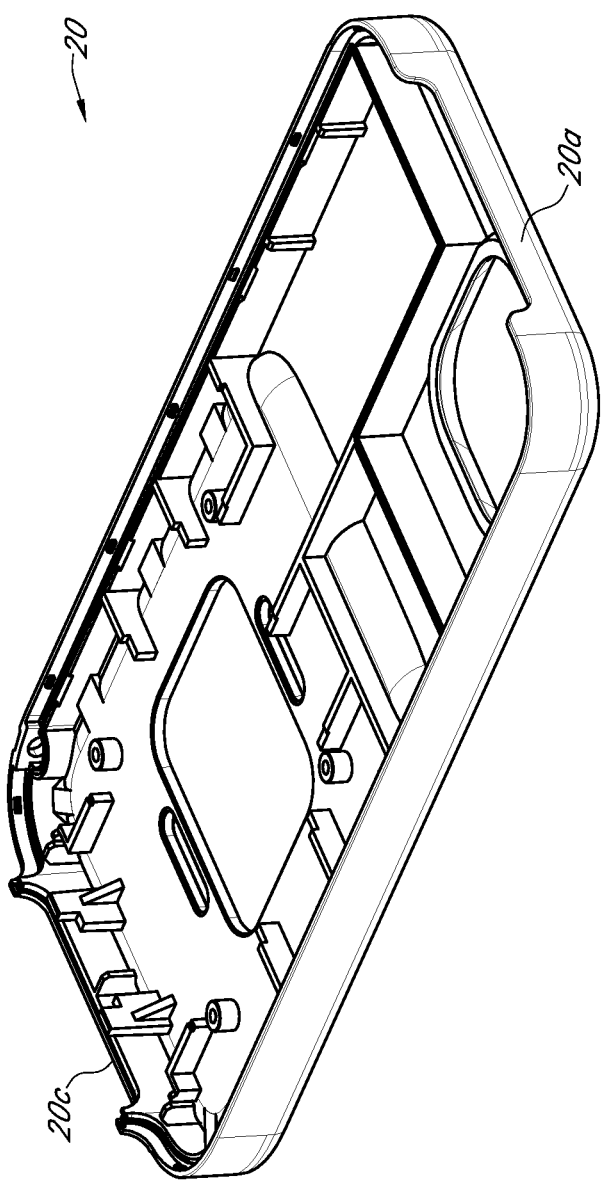
FIG. 9A is a top perspective view of rear assembly of case system.

Turning to FIG. 9A, depicted therein is a top perspective view of rear assembly 20 of case system 10.

Figure 10:
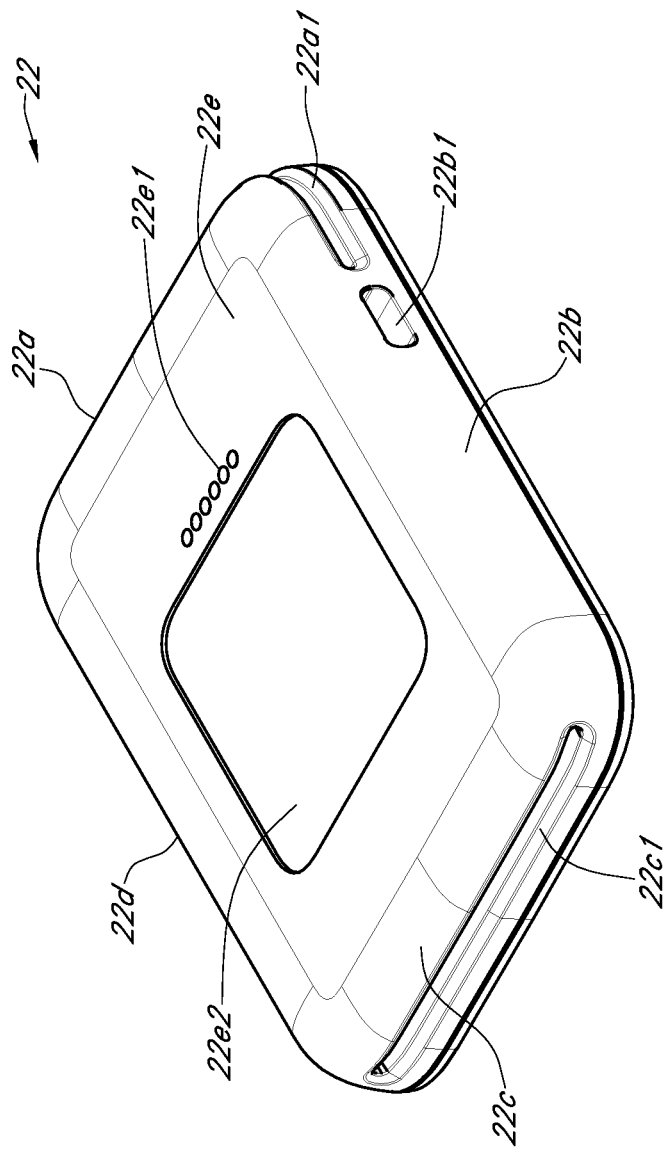
FIG. 10 is a top perspective view of card reader of case system.

Turning to FIG. 10, depicted therein is a top perspective view of card reader 22 of case system 10. Depicted implementation of rear assembly 20 is shown to include side 22a with swipe slot 22a1, side 22b with port portion 22b1, side 22c with insertion slot 22c1, side 22d, base 22e with contact 22e1 and magnetic portion 22e2.

Figure 11:
FIG. 11 is a top perspective view of card reader of case system.

Turning to FIG. 11, depicted therein is a top perspective view of card reader 22 of case system 10.

Figure 12:
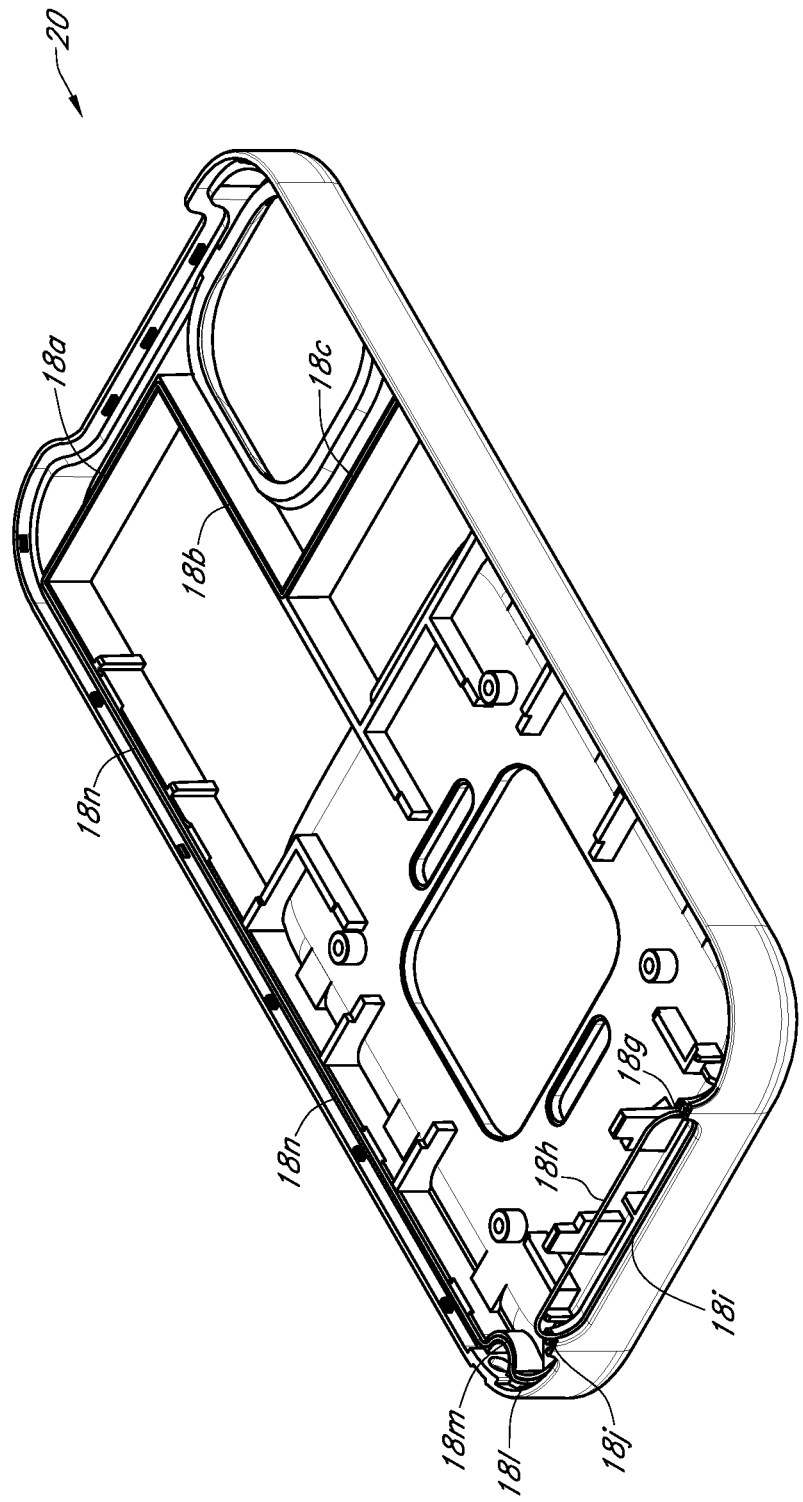
FIG. 12 is a top perspective view of gasket member and rear assembly of case system.

Turning to FIG. 12, depicted therein is a top perspective view of gasket member 18 and rear assembly 20 of case system 10.

Figure 13:
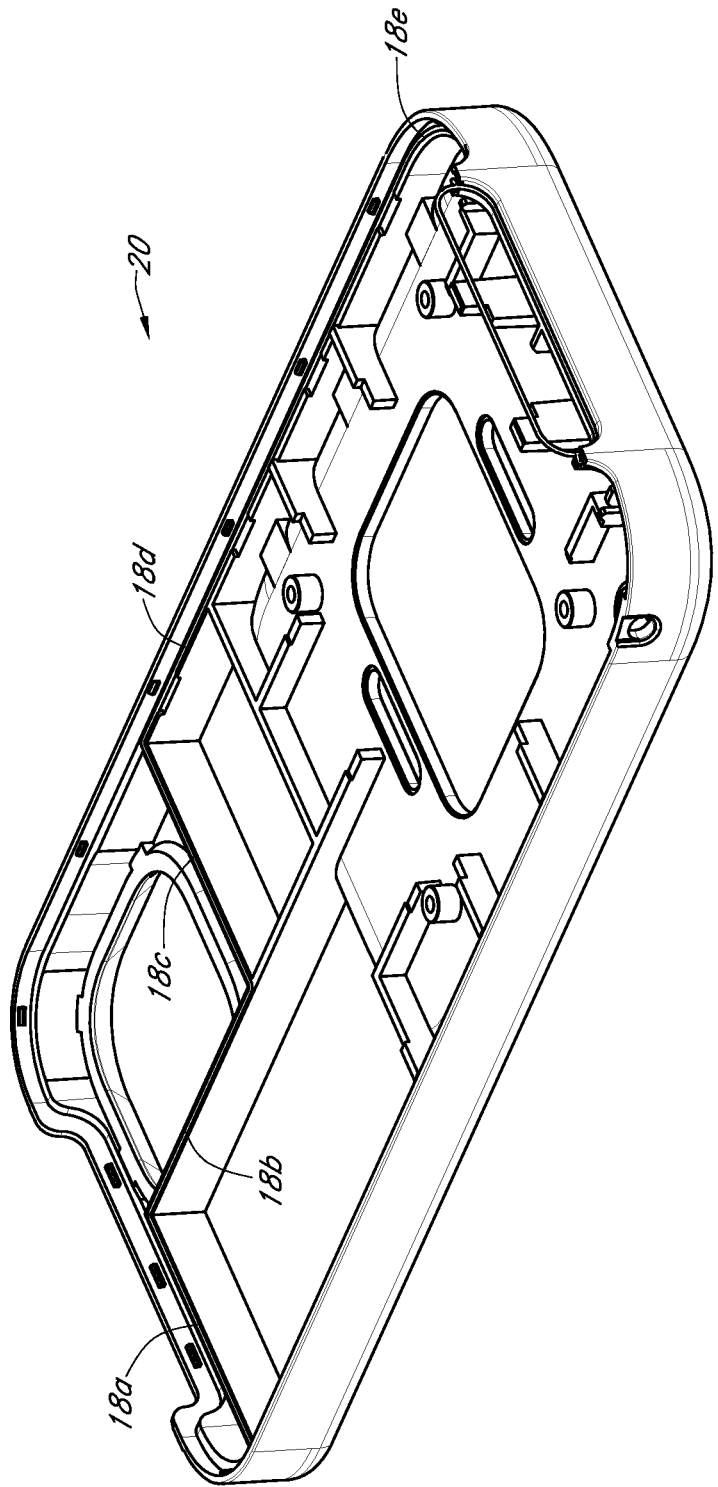
FIG. 13 is a top plan view of gasket member and rear assembly of case system.

Turning to FIG. 13, depicted therein is a top plan view of gasket member 18 and rear assembly 20 of case system 10.

Figure 14:
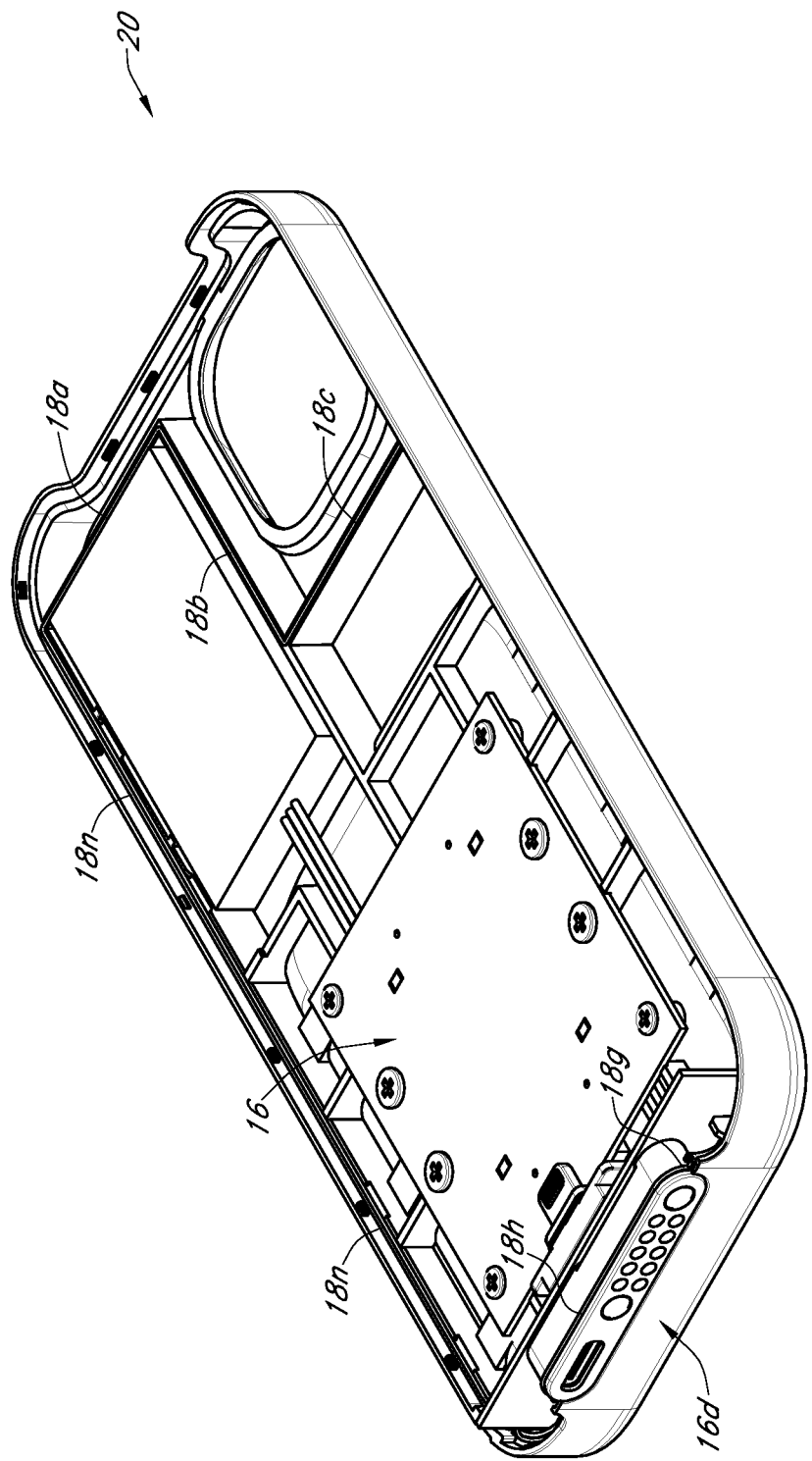
FIG. 14 is a top perspective view of electronics assembly, gasket member, and rear assembly of case system.

Turning to FIG. 14, depicted therein is a top perspective view of electronics assembly 16, gasket member 18, and rear assembly 20 of case system 10.

Figure 15:
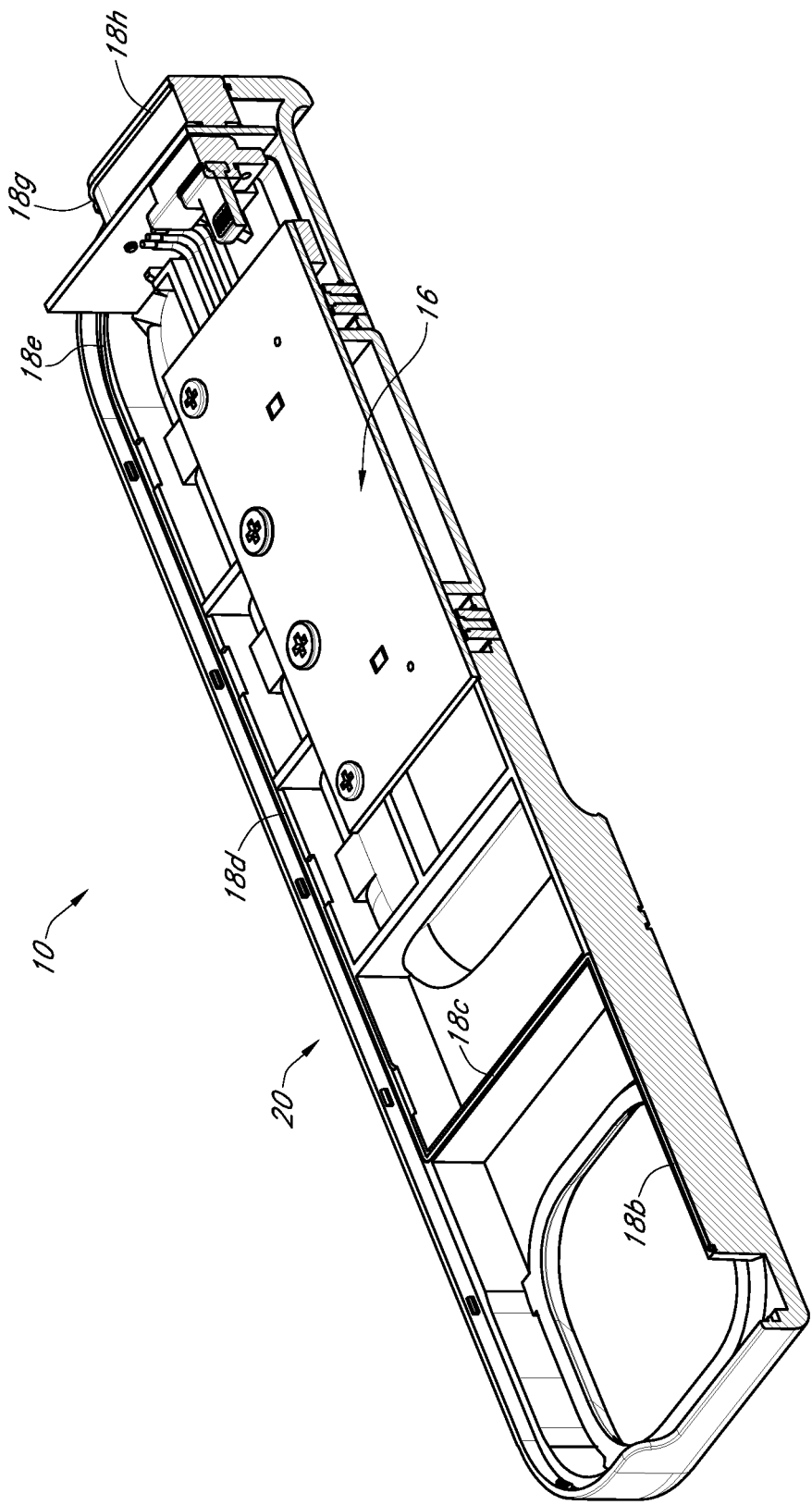
FIG. 15 is a top perspective cross-sectional view of electronics assembly, gasket member, and rear assembly of case system.

Turning to FIG. 15, depicted therein is a top perspective cross-sectional view of electronics assembly 16, gasket member 18, and rear assembly 20 of case system 10.

Figure 16:
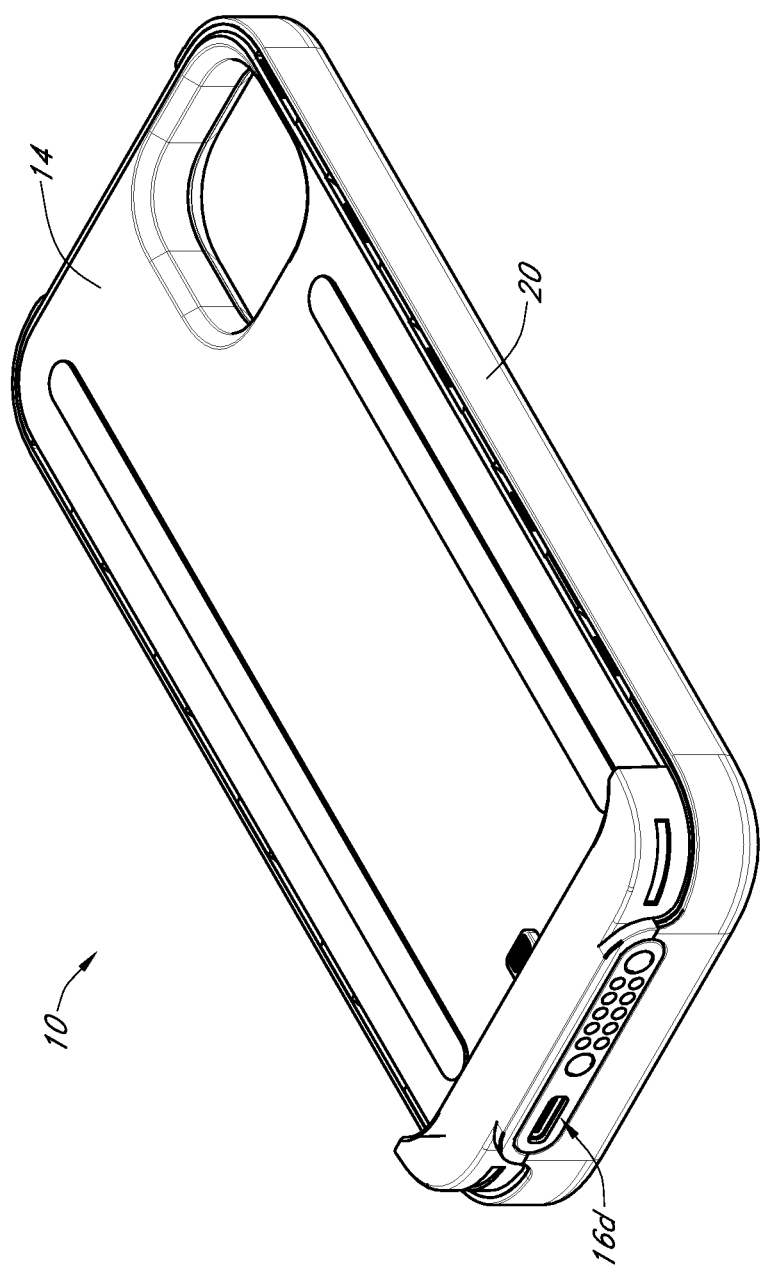
FIG. 16 is a top perspective view of front assembly, electronics assembly, and rear assembly of case system.

Turning to FIG. 16, depicted therein is a top perspective view of front assembly 14, electronics assembly 16, and rear assembly 20 of case system 10. As depicted, front assembly 14, and rear assembly 20 couple to form an opening sized to couple with electronics assembly 16.

Figure 17:
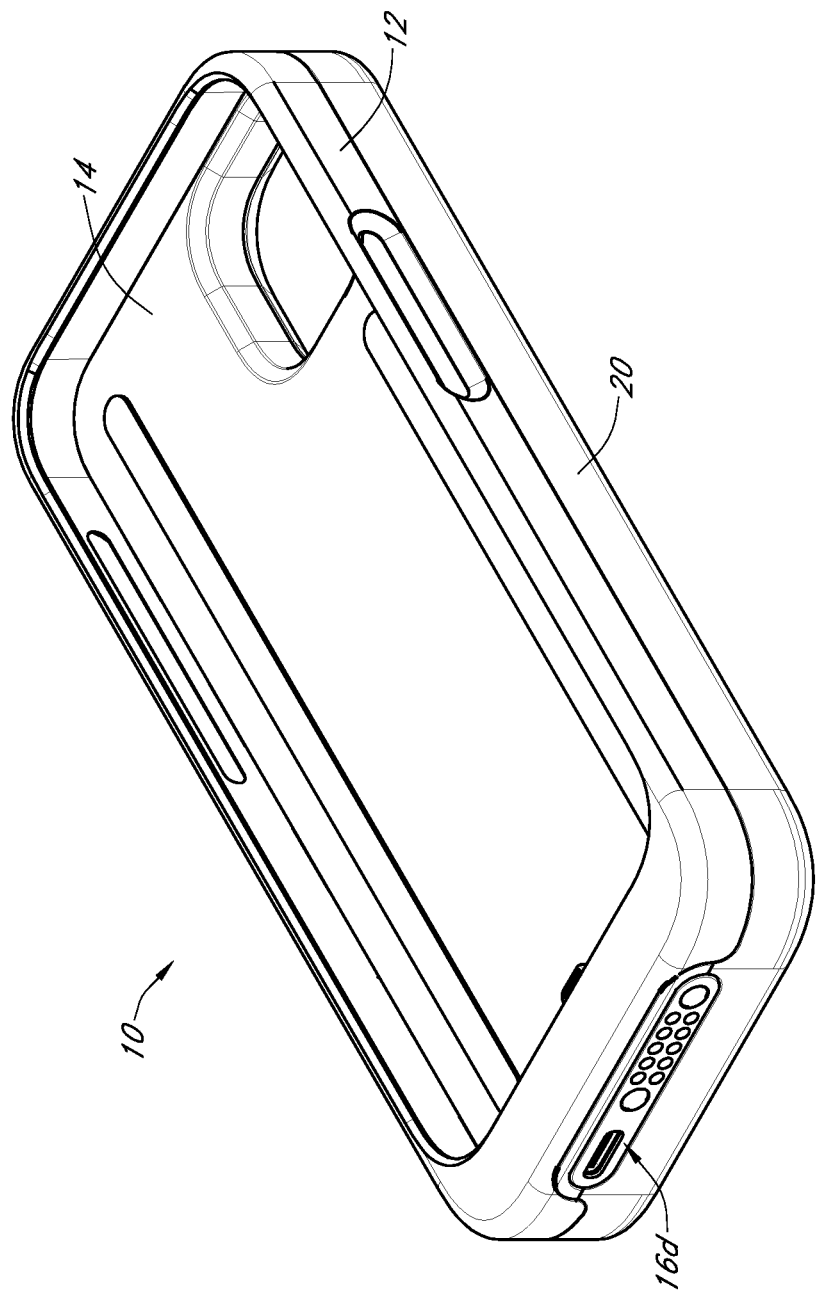
FIG. 17 is a top perspective view of bezel assembly, front assembly, electronics assembly, and rear assembly of case system.

Turning to FIG. 17, depicted therein is a top perspective view of bezel assembly 12, front assembly 14, electronics assembly 16, and rear assembly 20 of case system 10.

Figure 18:
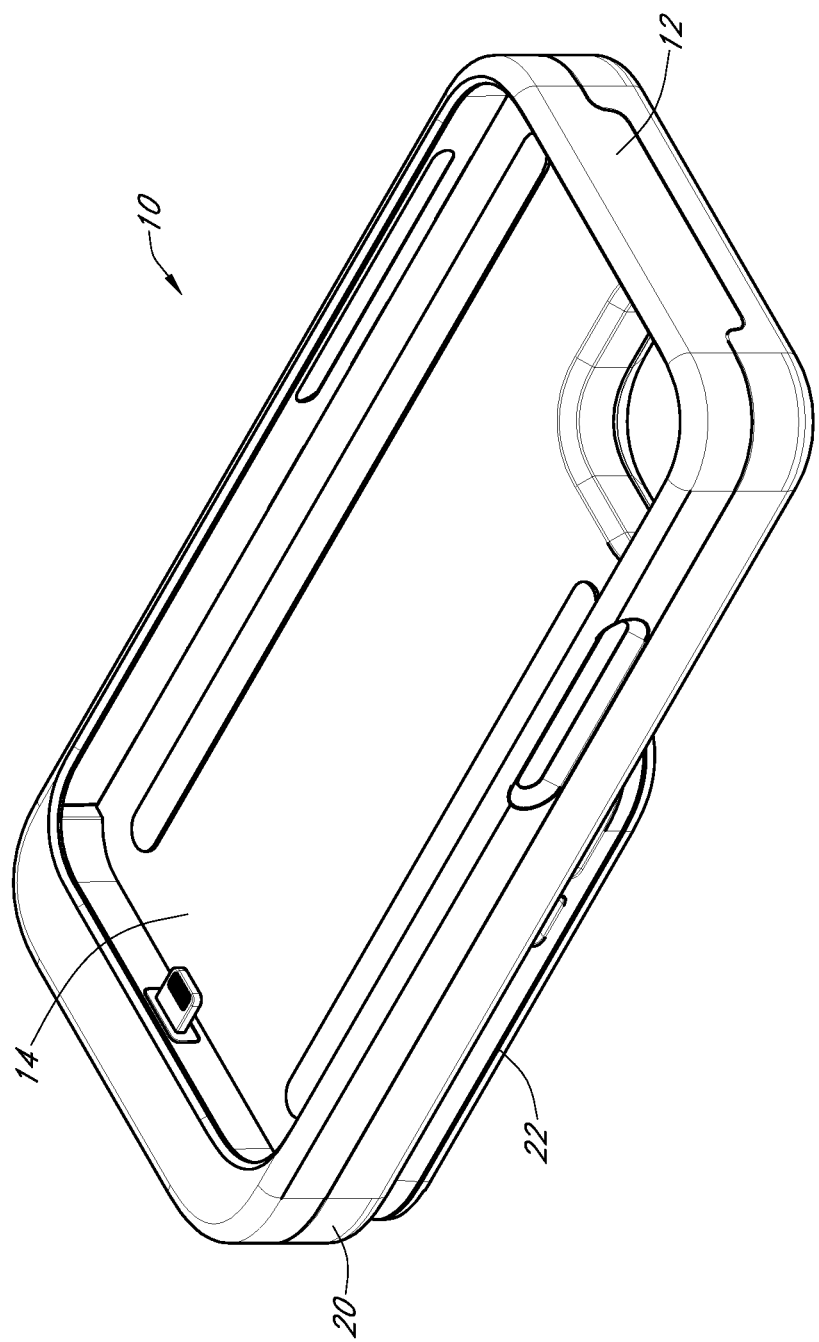
FIG. 18 is a top perspective view of case system.

Turning to FIG. 18, depicted therein is a top perspective view of case system 10.

Figure 19:
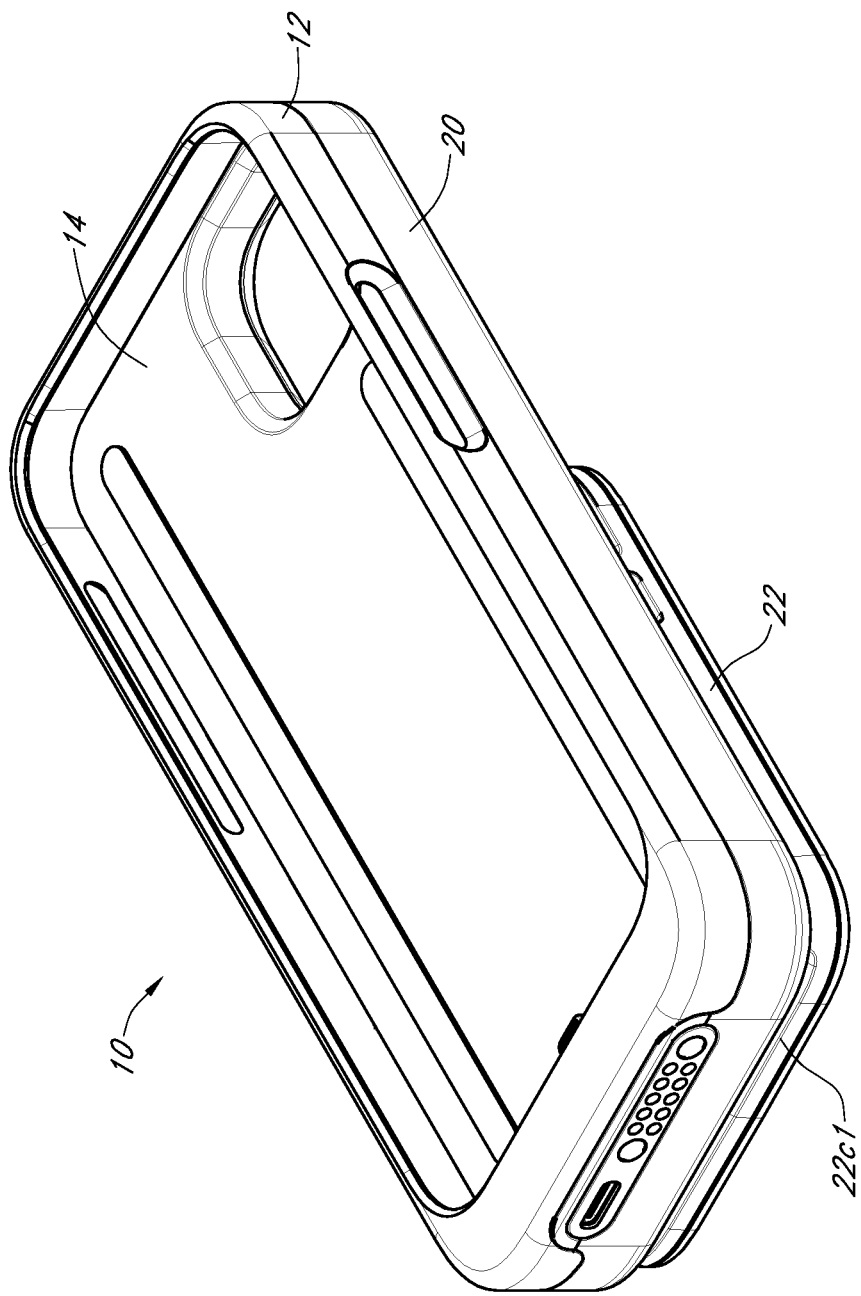
FIG. 19 is a top perspective view of case system.

Turning to FIG. 19, depicted therein is a top perspective view of case system 10.

Figure 20:
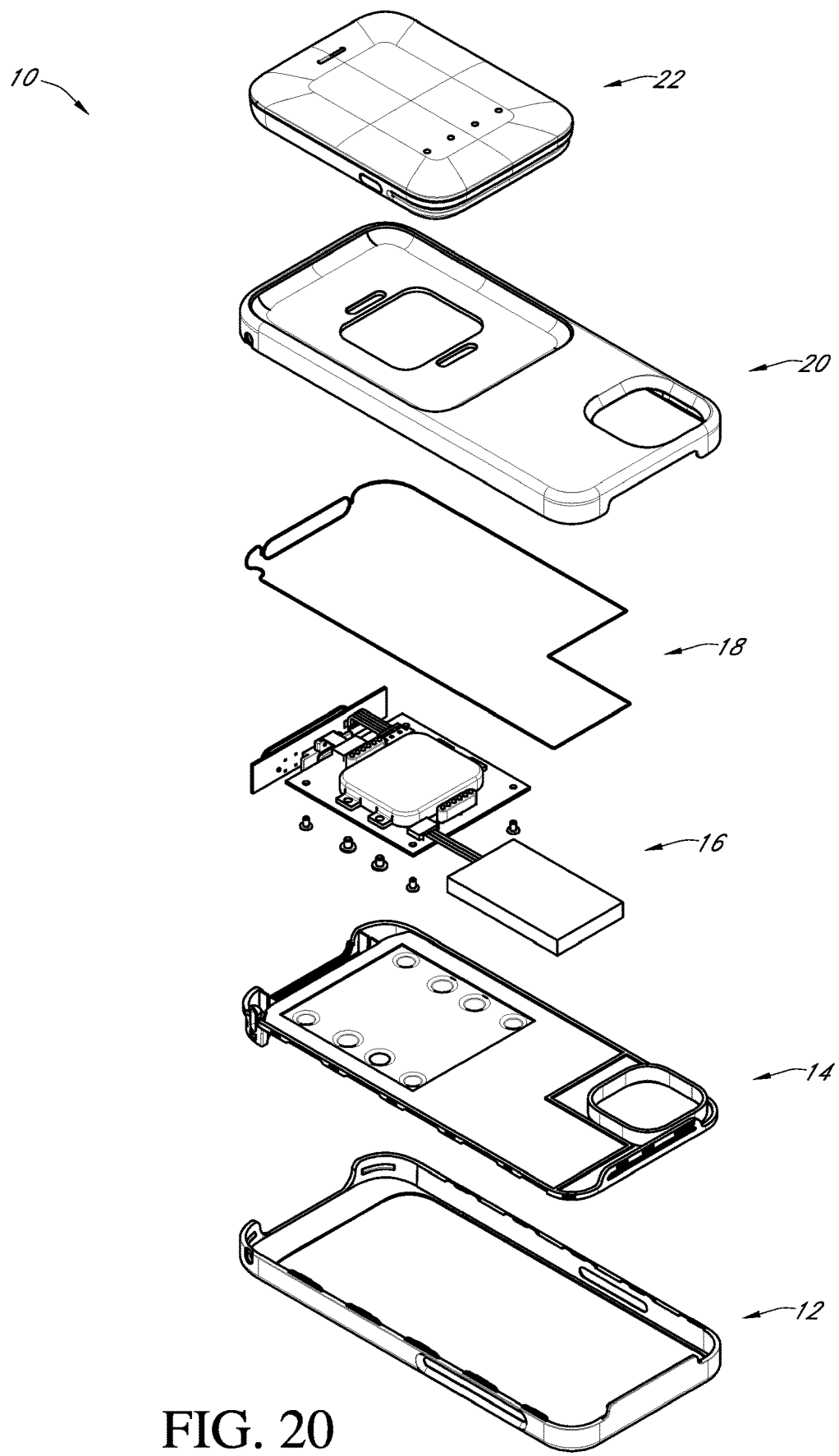
FIG. 20 is an exploded bottom perspective view of case system.

Turning to FIG. 20, depicted therein is an exploded bottom perspective view of case system 10.

Figure 21:
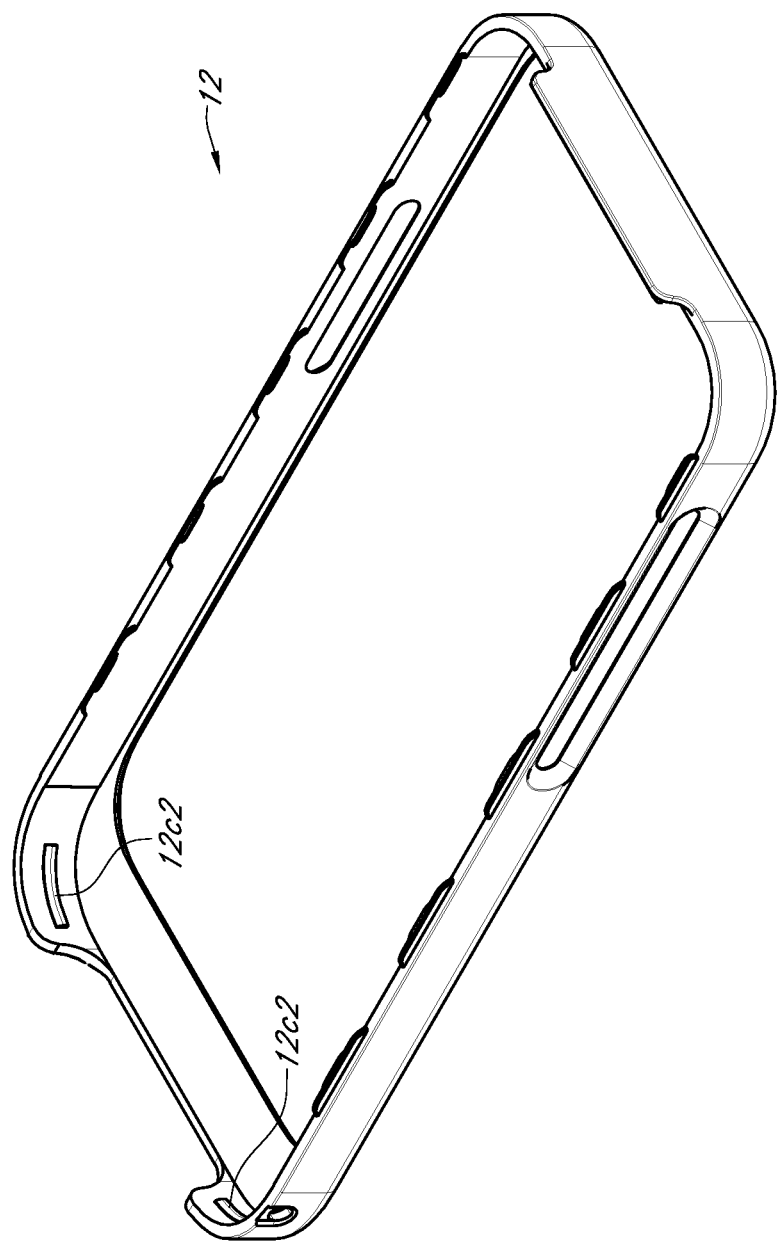
FIG. 21 is a bottom perspective view of bezel assembly of case system.

Turning to FIG. 21, depicted therein is a bottom perspective view of bezel assembly 12 of case system 10. Depicted implementation of bezel assembly 12 is shown to include aperture 12c2.

Figure 22:
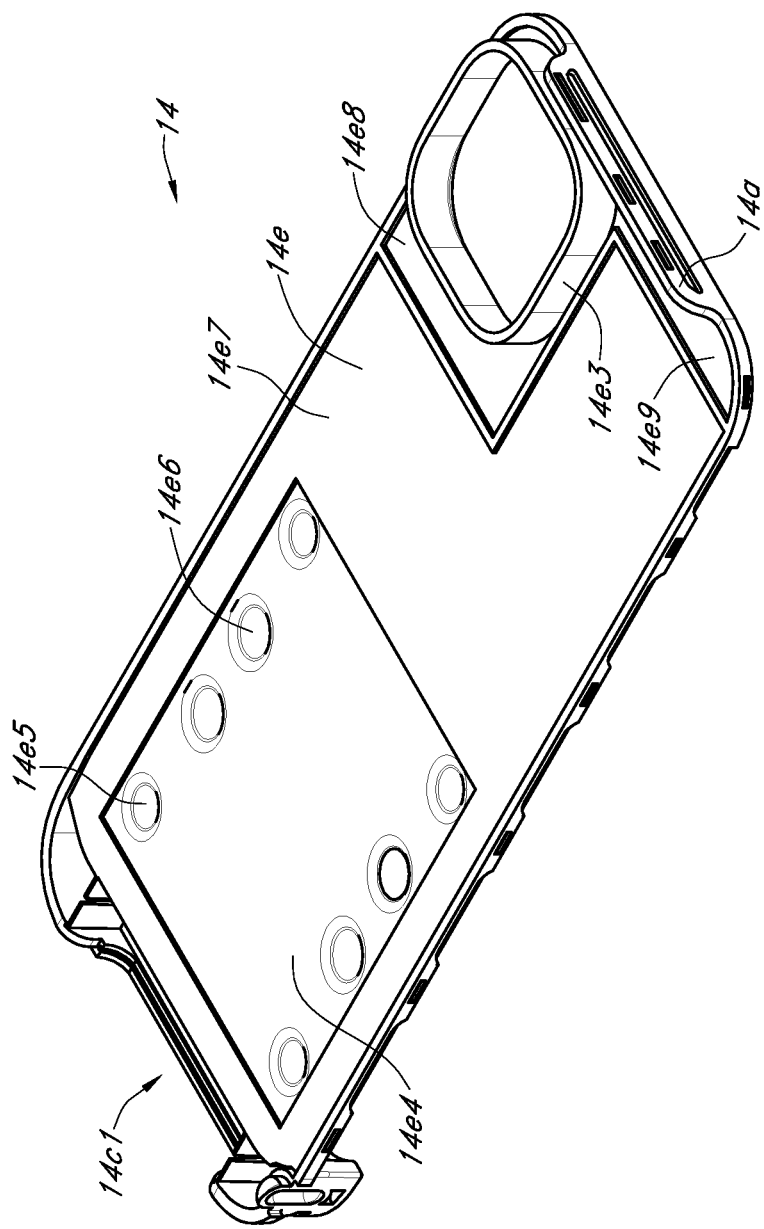
FIG. 22 is a bottom perspective view of front assembly of case system.

Turning to FIG. 22, depicted therein is a bottom perspective view of front assembly 14 of case system 10. Depicted implementation of front assembly 14 is shown to include rim portion 14e3, recess portion 14e4, first recess 14e5, second recess 14e6, base portion 14e7, base portion 14e8, and base portion 14e9.

Figure 23:
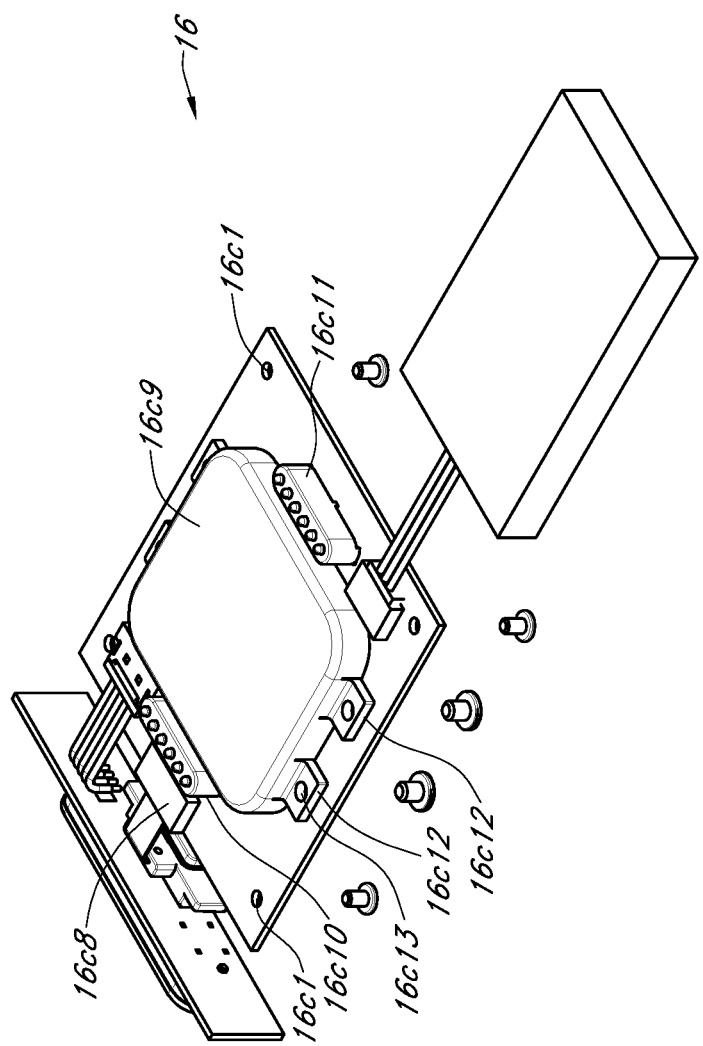
FIG. 23 is a bottom perspective view of electronics assembly of case system.
Figure 38:
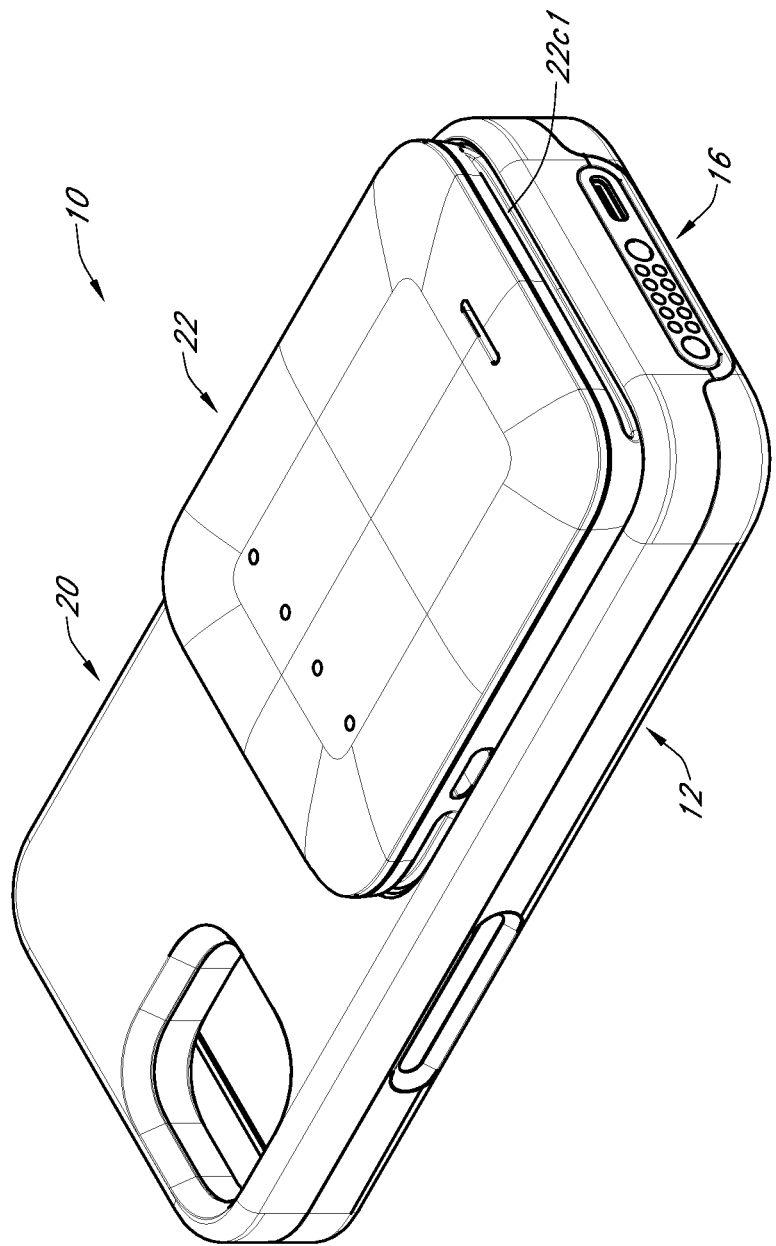
FIG. 38 is a bottom perspective view of case system.
Figure 39:
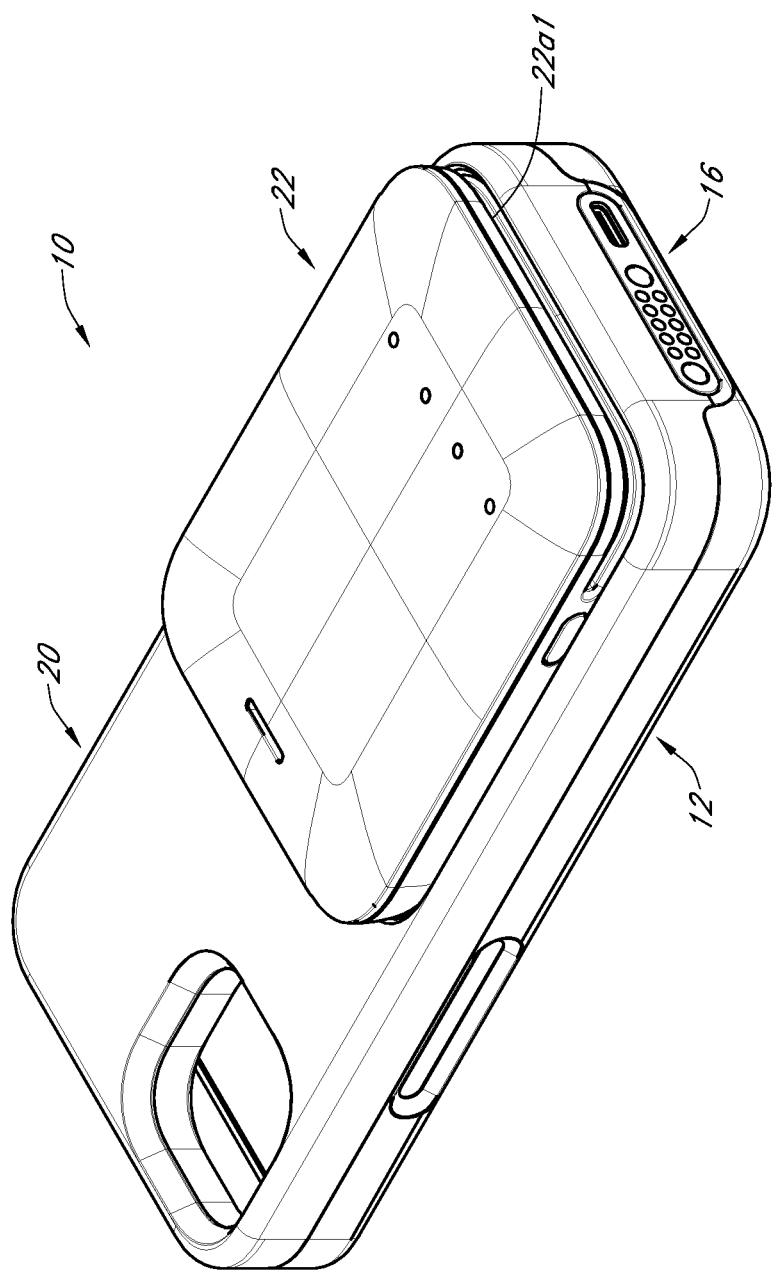
FIG. 39 is a bottom perspective view of case system.

Turning to FIG. 23, depicted therein is a bottom perspective view of electronics assembly 16 of case system 10. Depicted implementation of electronics assembly 16 is shown to include cabling portion 16c8, metallic portion 16c9 (such as a metal plate), electrical connector assembly 16c10, electrical connector assembly 16c11, protrusion 16c12, and aperture 16c13. As depicted, electrical connector assembly 16c10 and electrical connector assembly 16c11 both have similar spatial arrangements of electrical contacts positioned along a row, which allows for contact 22e1 of card reader 22 to be electrically coupled with electrical connector assembly 16c10 when card reader 22 is coupled to rear assembly 20 in a first position (such as shown in FIG. 39) and to be electrically coupled with electrical connector assembly 16c11 when card reader 22 is coupled to rear assembly 20 in a second position 180 degrees from the first position (such as shown in FIG. 38).

Figure 24:
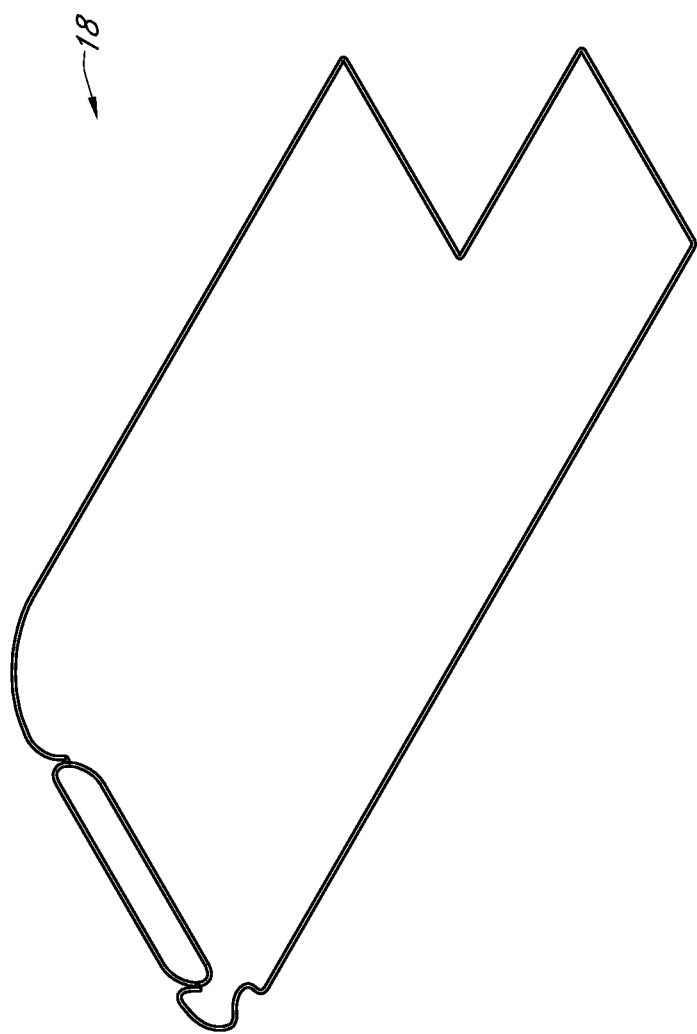
FIG. 24 is a bottom perspective view of gasket member of case system.

Turning to FIG. 24, depicted therein is a bottom perspective view of gasket member 18 of case system 10.

Figure 25:
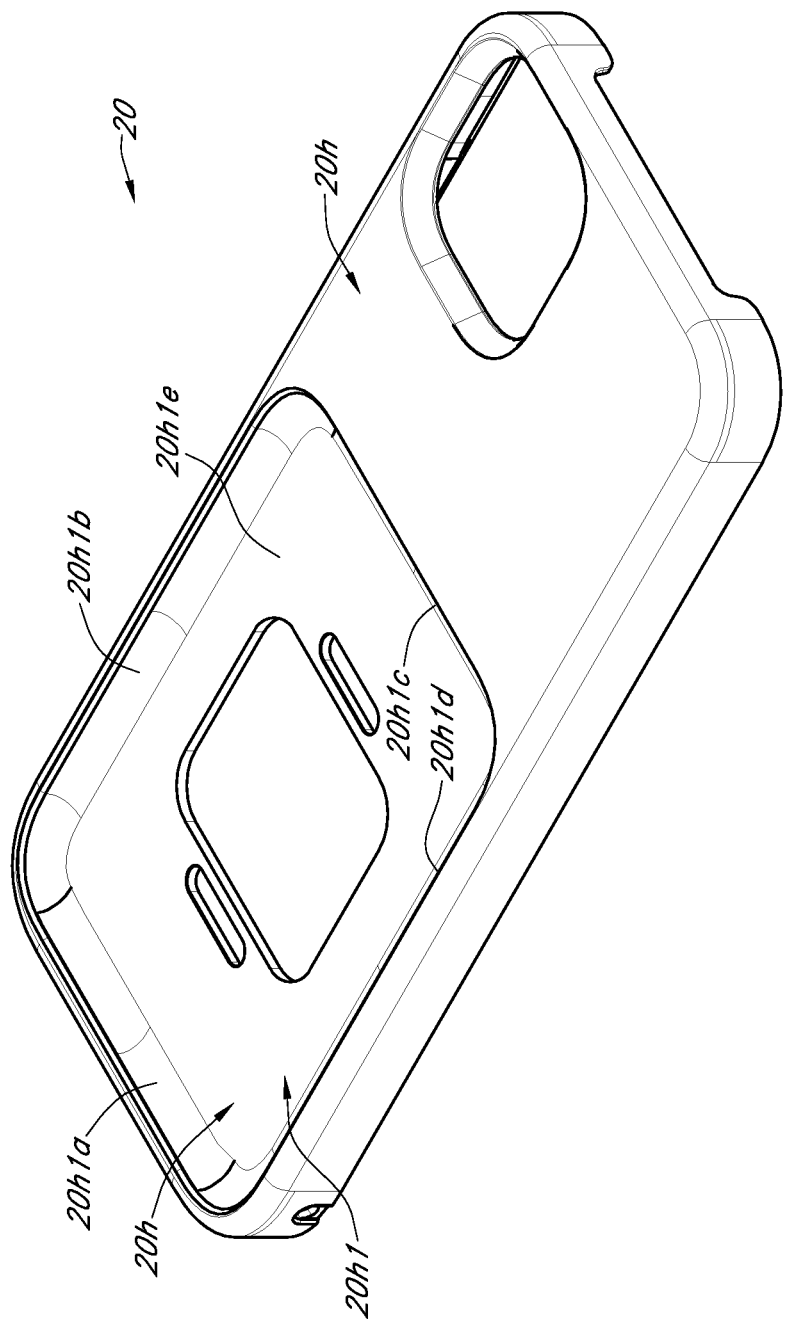
FIG. 25 is a bottom perspective view of rear assembly of case system.

Turning to FIG. 25, depicted therein is a bottom perspective view of rear assembly 20 of case system 10. Depicted implementation of rear assembly 20 is shown to include base exterior 20h with recess 20h1. Depicted implementation of recess 20h1 is shown to include side 20h1a, side 20h1b. side 20h1c, side 20h1d, and base 20h1e. As depicted, connector aperture 20e5 (see FIG. 8) and connector aperture 20e6 (see FIG. 8) are equally spaced from side 20h1b and side 20h1d.

Figure 26:
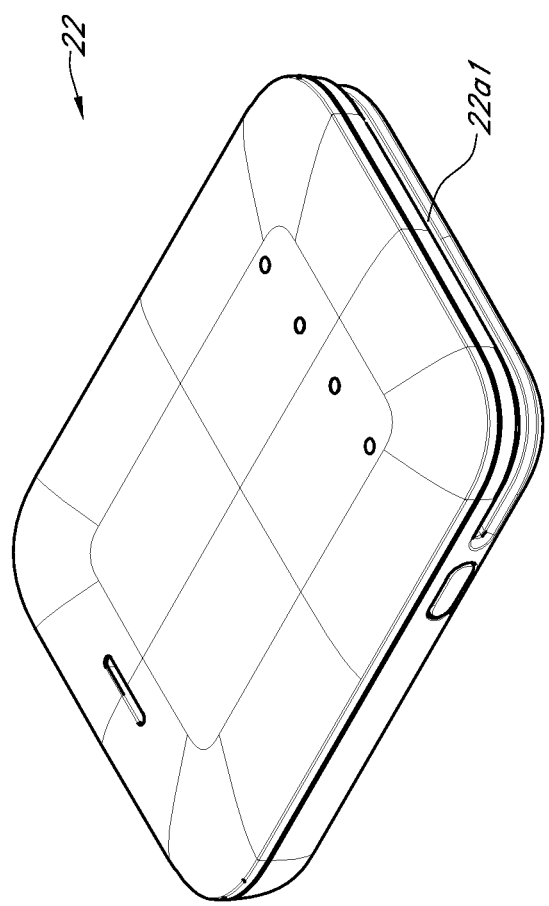
FIG. 26 is a bottom perspective view of card reader of case system.

Turning to FIG. 26, depicted therein is a bottom perspective view of card reader 22 of case system 10.

Figure 27:
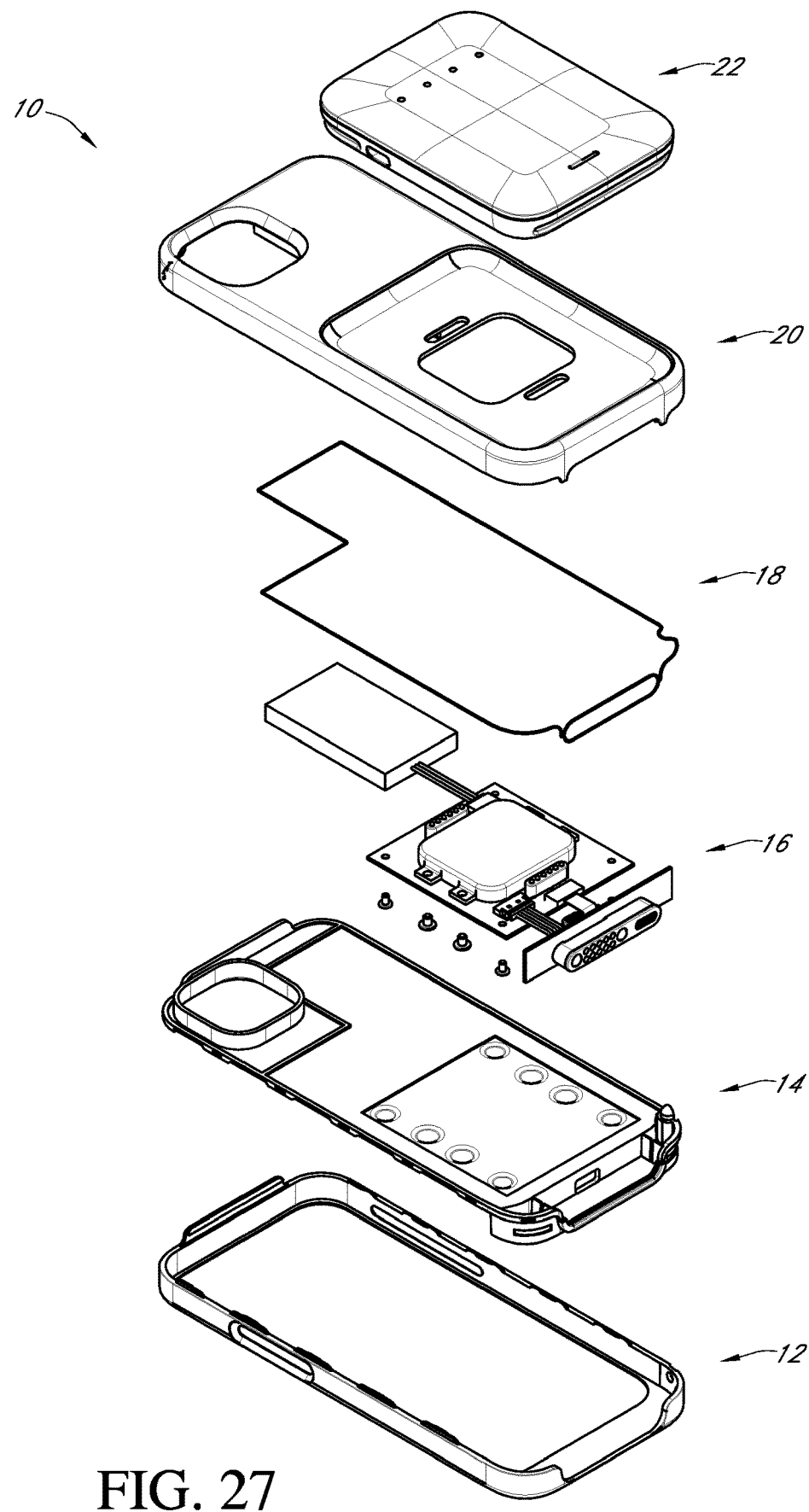
FIG. 27 is an exploded bottom perspective view of case system.

Turning to FIG. 27, depicted therein is an exploded bottom perspective view of case system 10.

Figure 28:
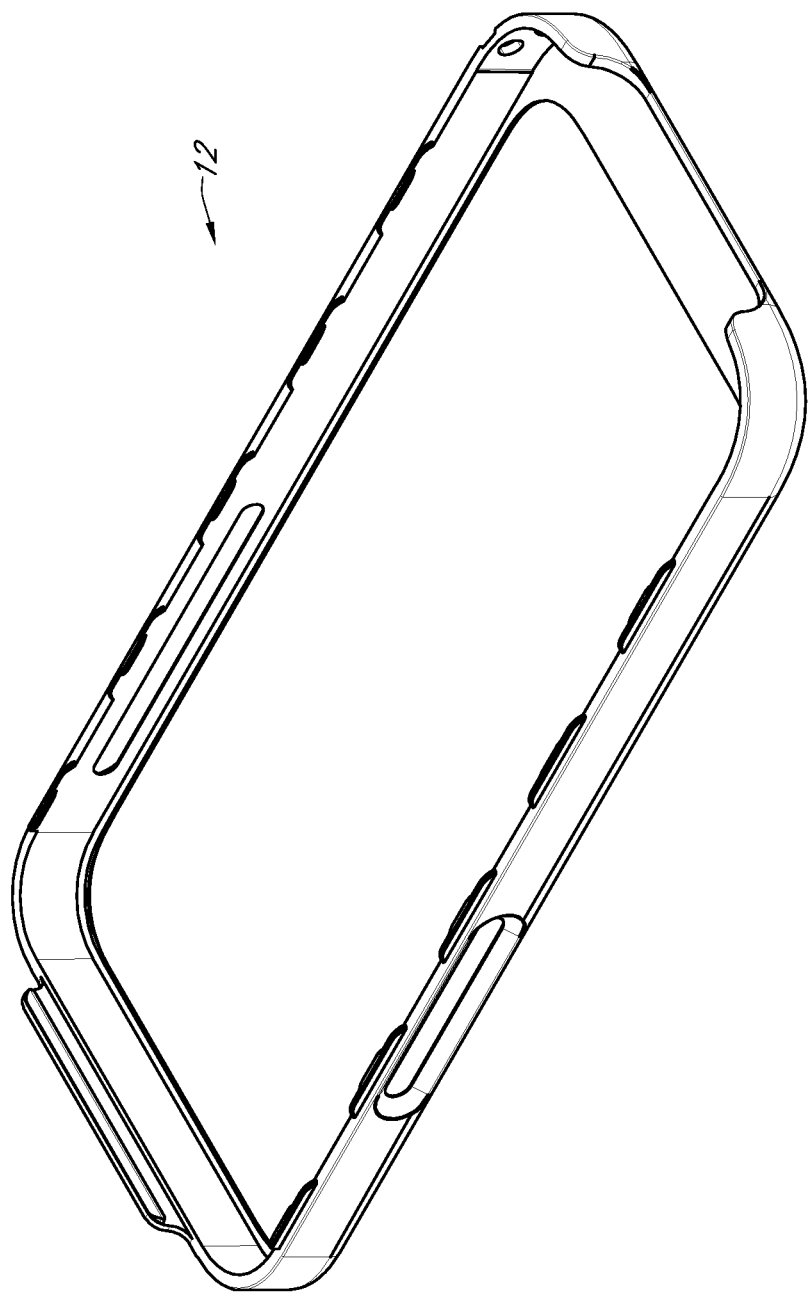
FIG. 28 is a bottom perspective view of bezel assembly of case system.

Turning to FIG. 28, depicted therein is a bottom perspective view of bezel assembly 12 of case system 10.

Figure 29:
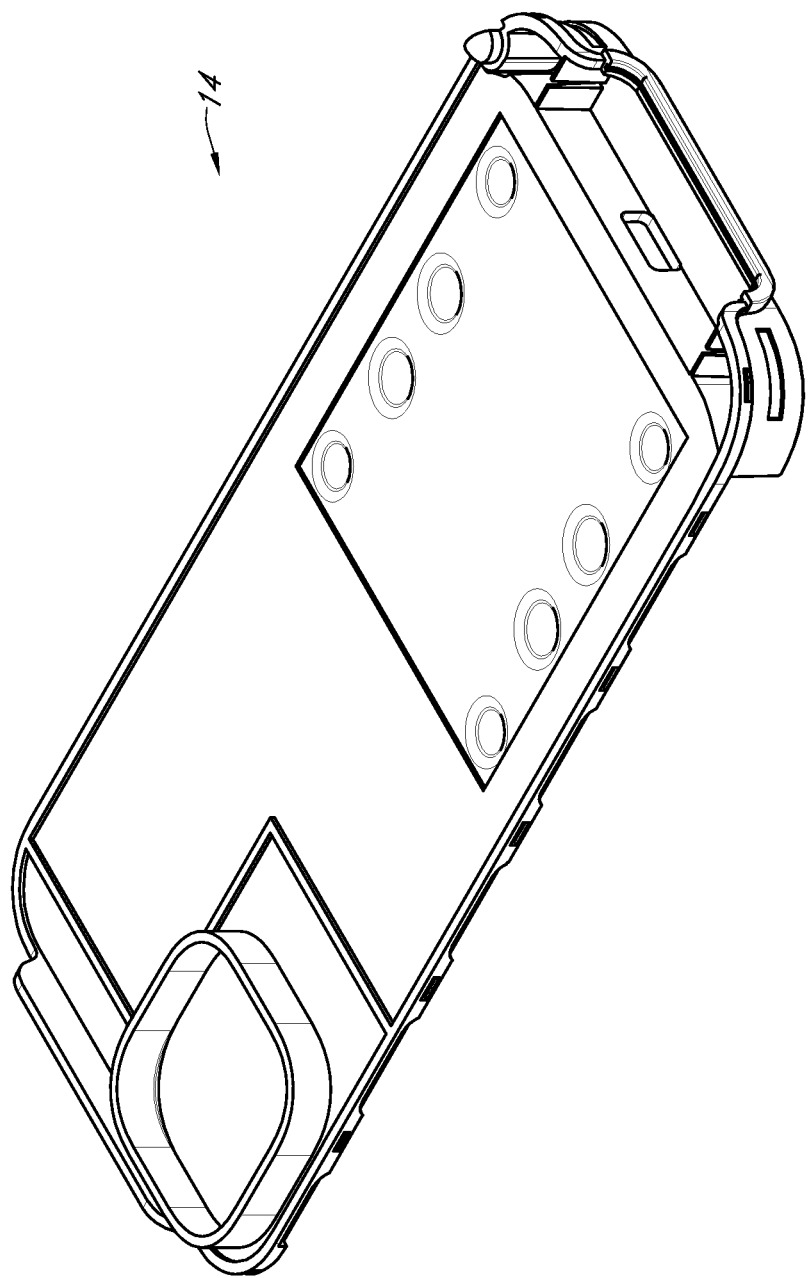
FIG. 29 is a bottom perspective view of front assembly of case system.

Turning to FIG. 29, depicted therein is a bottom perspective view of front assembly 14 of case system 10.

Figure 30:
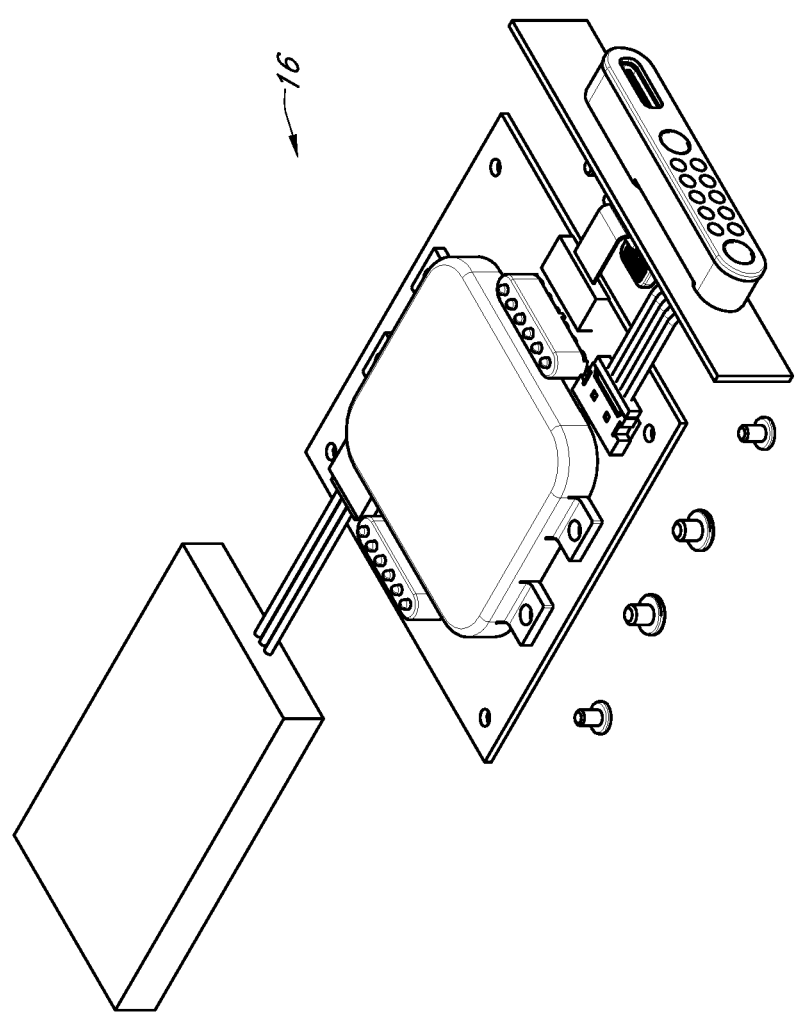
FIG. 30 is a bottom perspective view of electronics assembly of case system.

Turning to FIG. 30, depicted therein is a bottom perspective view of electronics assembly 16 of case system 10.

Figure 31:
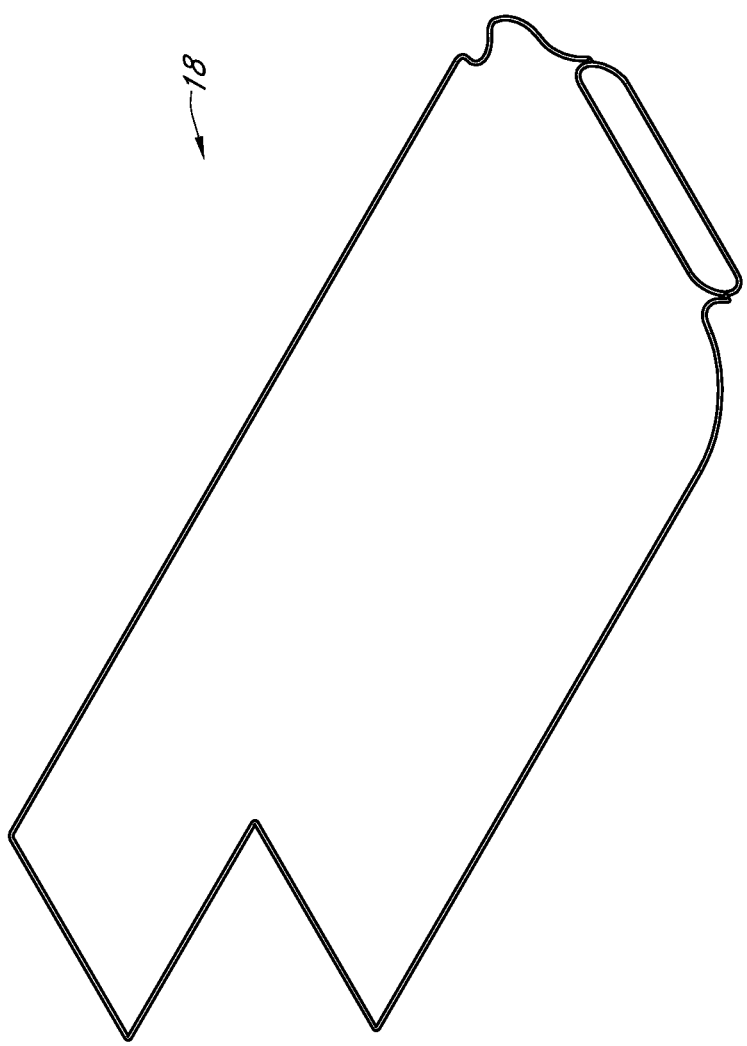
FIG. 31 is a bottom perspective view of gasket member of case system.

Turning to FIG. 31, depicted therein is a bottom perspective view of gasket member 18 of case system 10.

Figure 32:
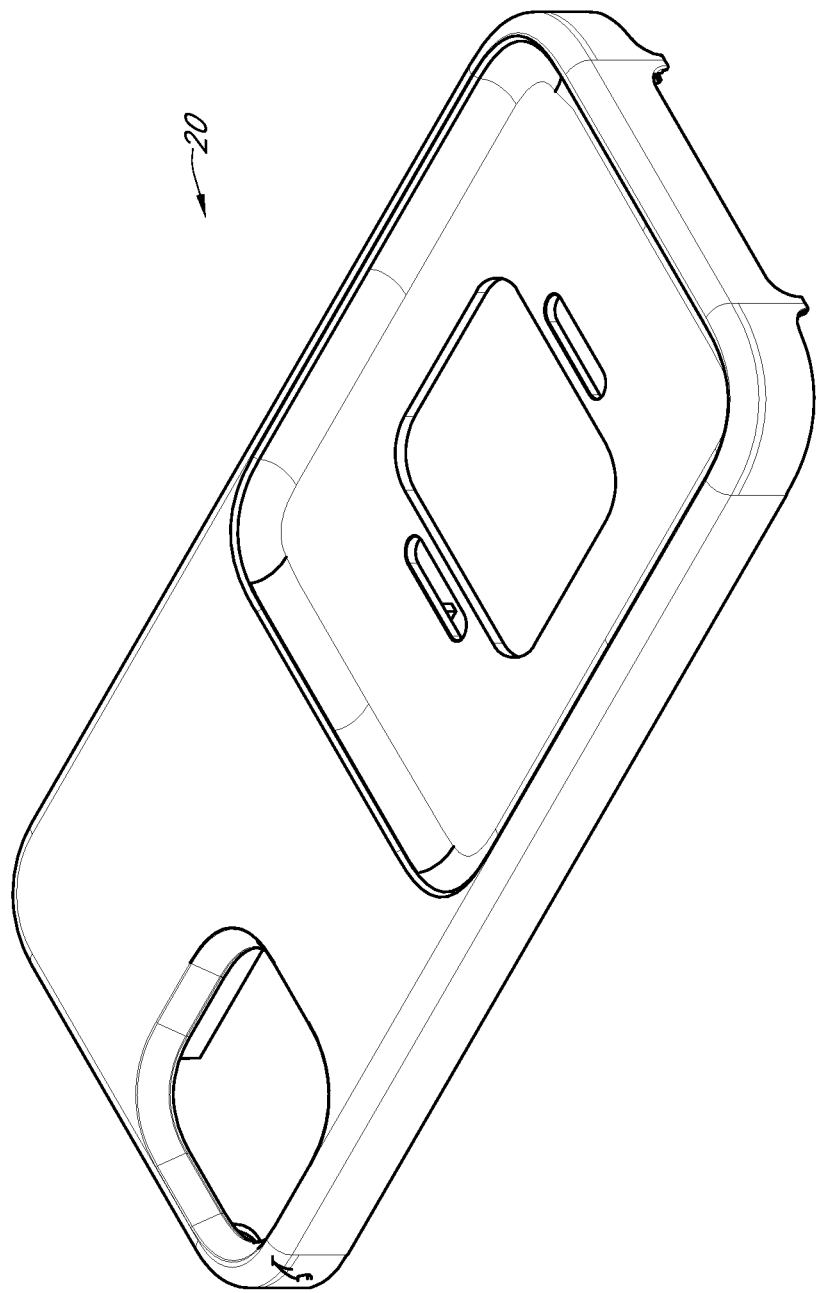
FIG. 32 is a bottom perspective view of rear assembly of case system.

Turning to FIG. 32, depicted therein is a bottom perspective view of rear assembly 20 of case system 10.

Figure 33:
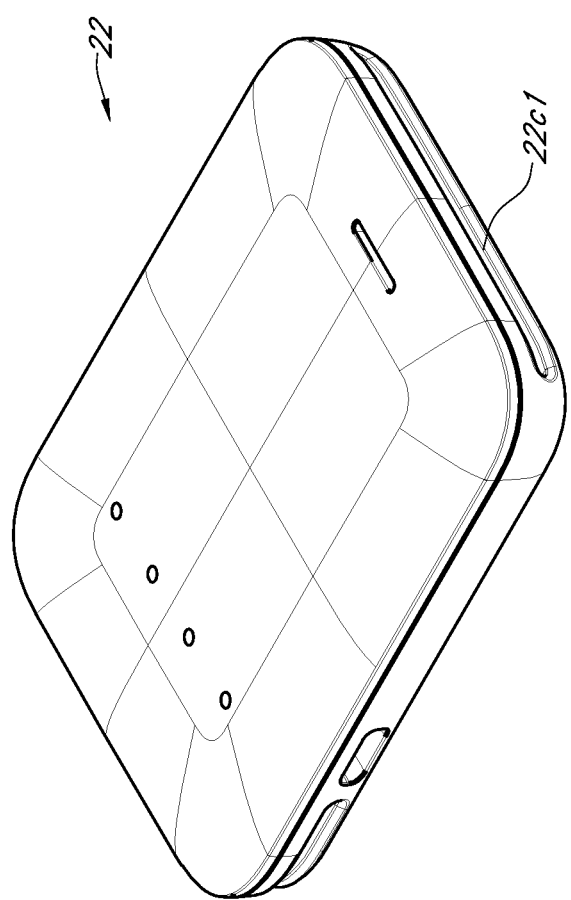
FIG. 33 is a bottom perspective view of card reader of case system.

Turning to FIG. 33, depicted therein is a bottom perspective view of card reader 22 of case system 10.

Figure 34:
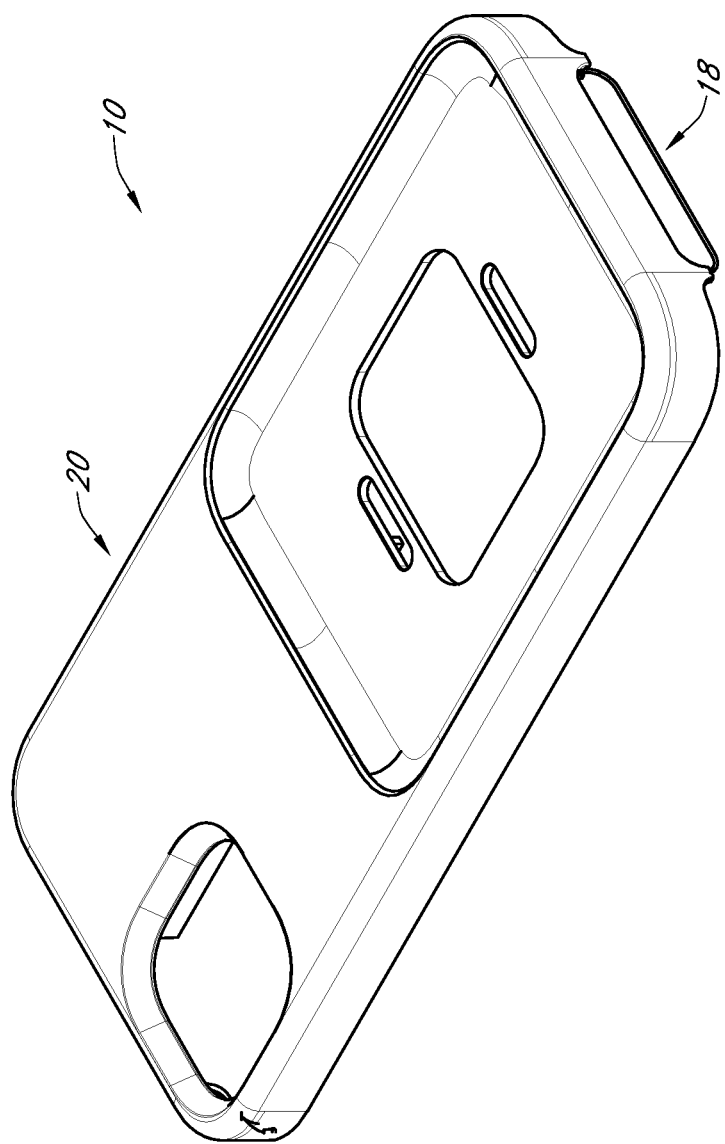
FIG. 34 is a bottom plan view of gasket member and rear assembly of case system.

Turning to FIG. 34, depicted therein is a bottom plan view of gasket member 18 and rear assembly 20 of case system 10.

Figure 35:
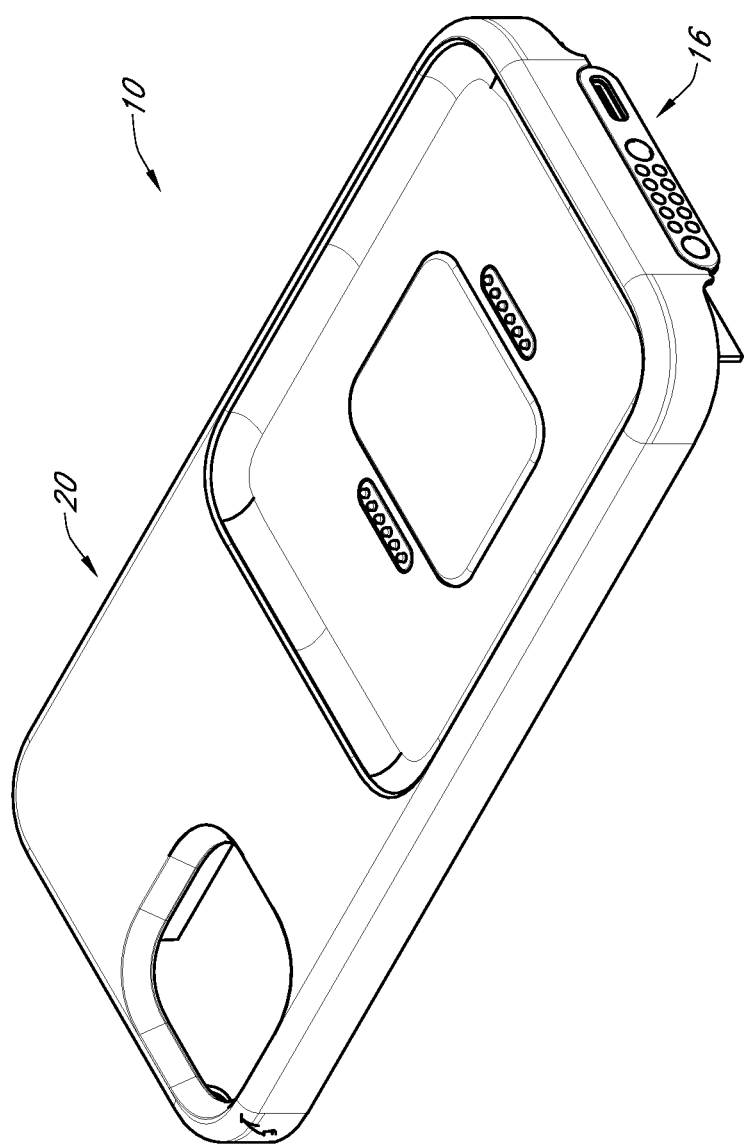
FIG. 35 is a top perspective view of electronics assembly, and rear assembly of case system.

Turning to FIG. 35, depicted therein is a top perspective view of electronics assembly 16 and rear assembly 20 of case system 10. As depicted, portions of electrical connector assembly 16c10 and electrical connector assembly 16c11 protrude through connector aperture 20e5 and connector aperture 20e6, respectively, to be accessed from base exterior 20h of rear assembly 20. As depicted, metallic portion 16c9 (see FIG. 23) is protruding through plate aperture 20e7 (see FIG. 8) to be accessed from base exterior 20h of rear assembly 20.

As discussed above regarding FIG. 23, electrical connector assembly 16c10 and electrical connector assembly 16c11 both have a spatial arrangement of electrical contacts positioned along a row. As depicted in FIG. 35, the electrical contacts on a first end of each of the two rows of electrical connector assembly 16c10 and electrical connector assembly 16c11 that are closest to side 20b (see FIG. 8) are equidistant from side 20b. As depicted in FIG. 35, the electrical contacts on a second end of each of the two rows of electrical connector assembly 16c10 and electrical connector assembly 16c11 that are closest to side 20d (see FIG. 8) are equidistant from side 20d. As depicted, electrical connector assembly 16c10 and electrical connector assembly 16c11 are similarly positioned with respect to metallic portion 16c9 (see FIG. 23) as protruding through plate aperture 20e7 (see FIG. 8).

Figure 36:
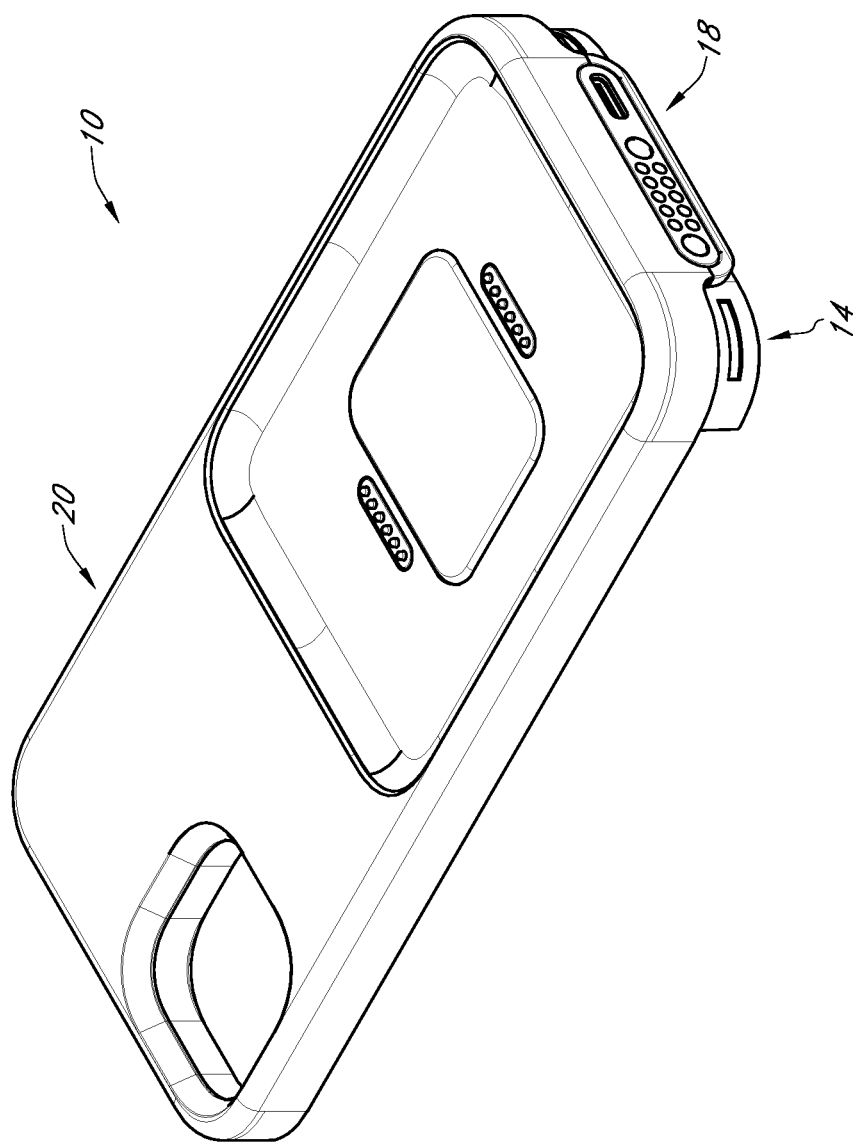
FIG. 36 is a top perspective view of front assembly, electronics assembly, and rear assembly of case system.

Turning to FIG. 36, depicted therein is a top perspective view of front assembly 14, electronics assembly 16, and rear assembly 20 of case system 10.

Figure 37:
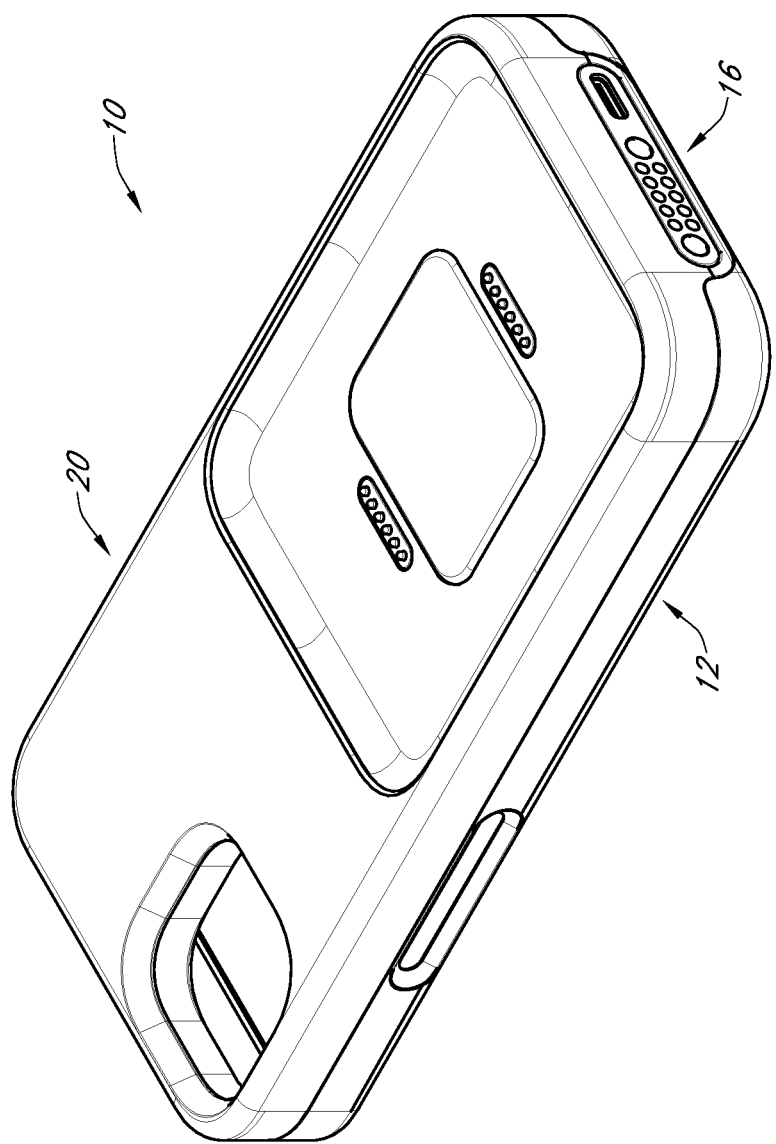
FIG. 37 is a top perspective view of bezel assembly, electronics assembly, and rear assembly of case system.

Turning to FIG. 37, depicted therein is a top perspective view of bezel assembly 12, electronics assembly 16, and rear assembly 20 of case system 10.

Turning to FIG. 38, depicted therein is a bottom perspective view of case system 10.

Turning to FIG. 39, depicted therein is a bottom perspective view of case system 10.

Figure 40:
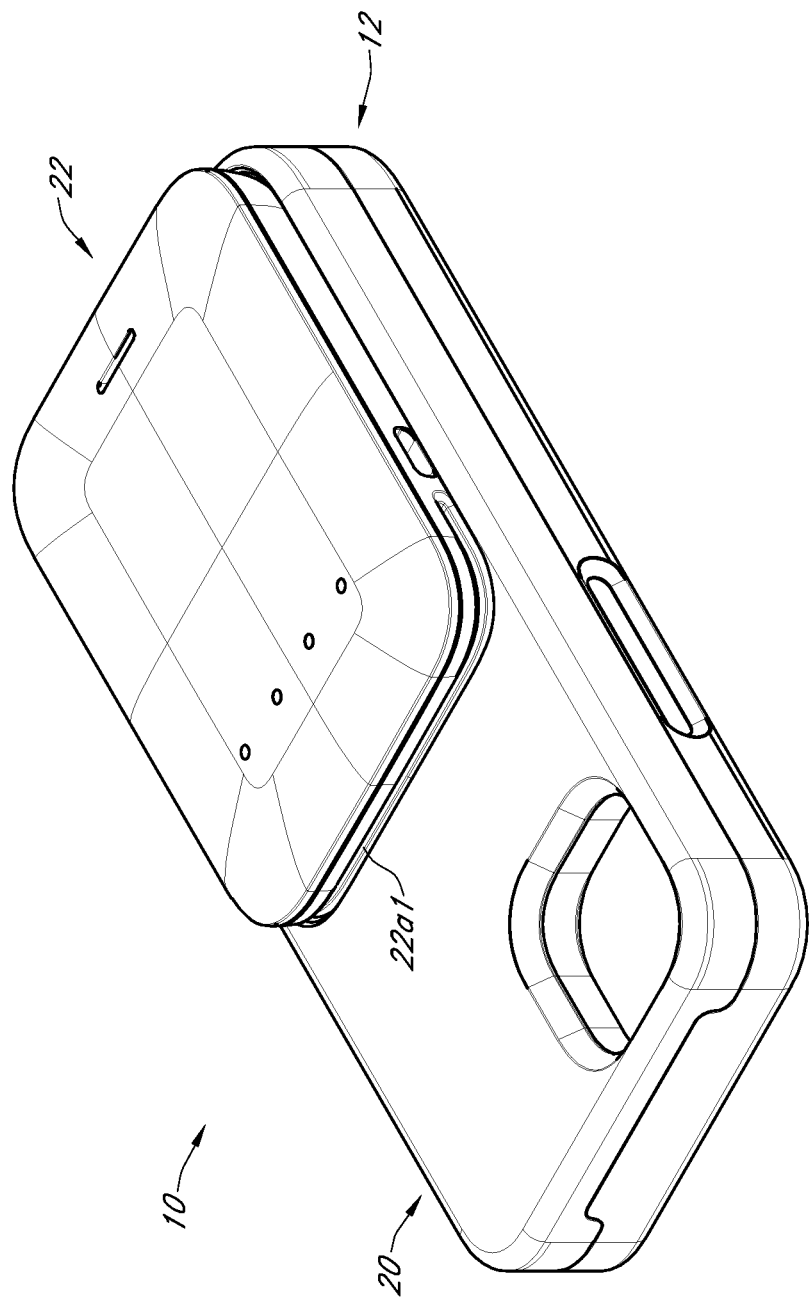
FIG. 40 is a bottom perspective view of case system.

Turning to FIG. 40, depicted therein is a bottom perspective view of case system 10.

Figure 41:
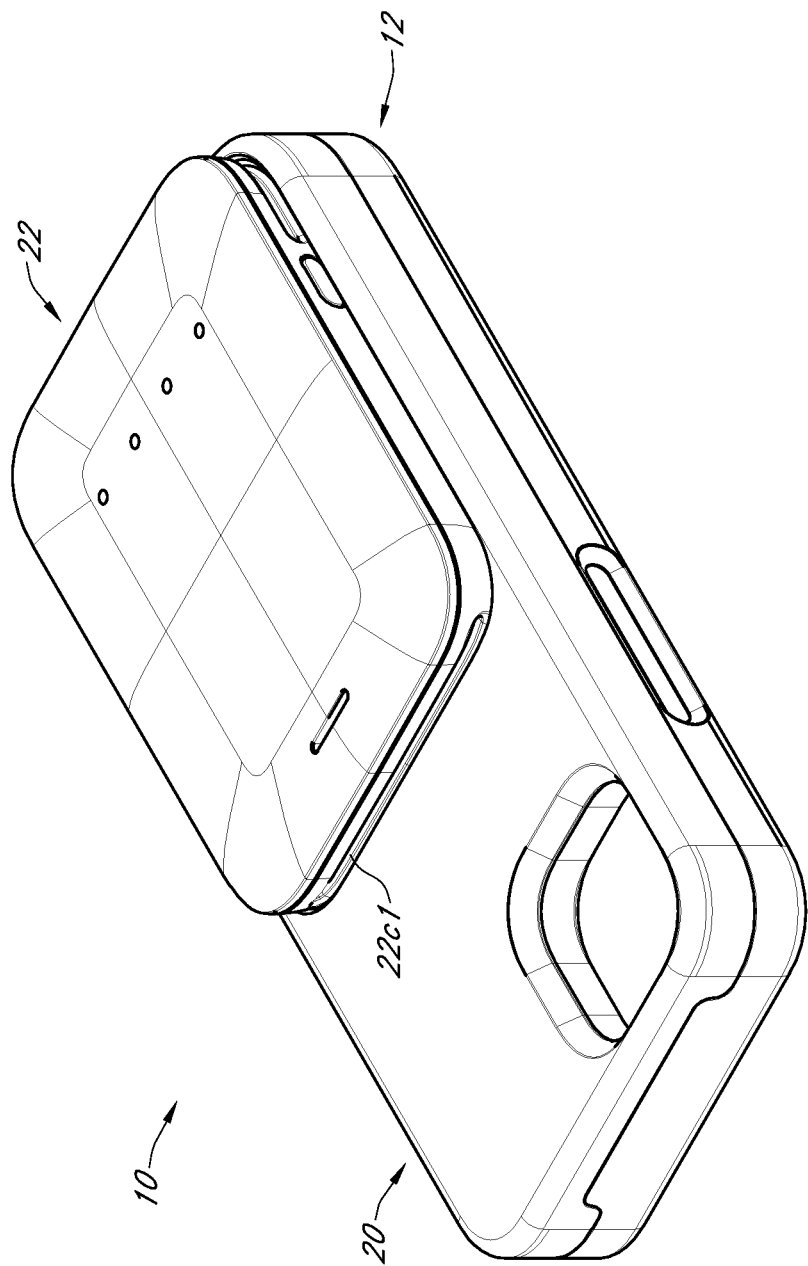
FIG. 41 is a bottom perspective view of case system.

Turning to FIG. 41, depicted therein is a bottom perspective view of case system 10.

Figure 42:
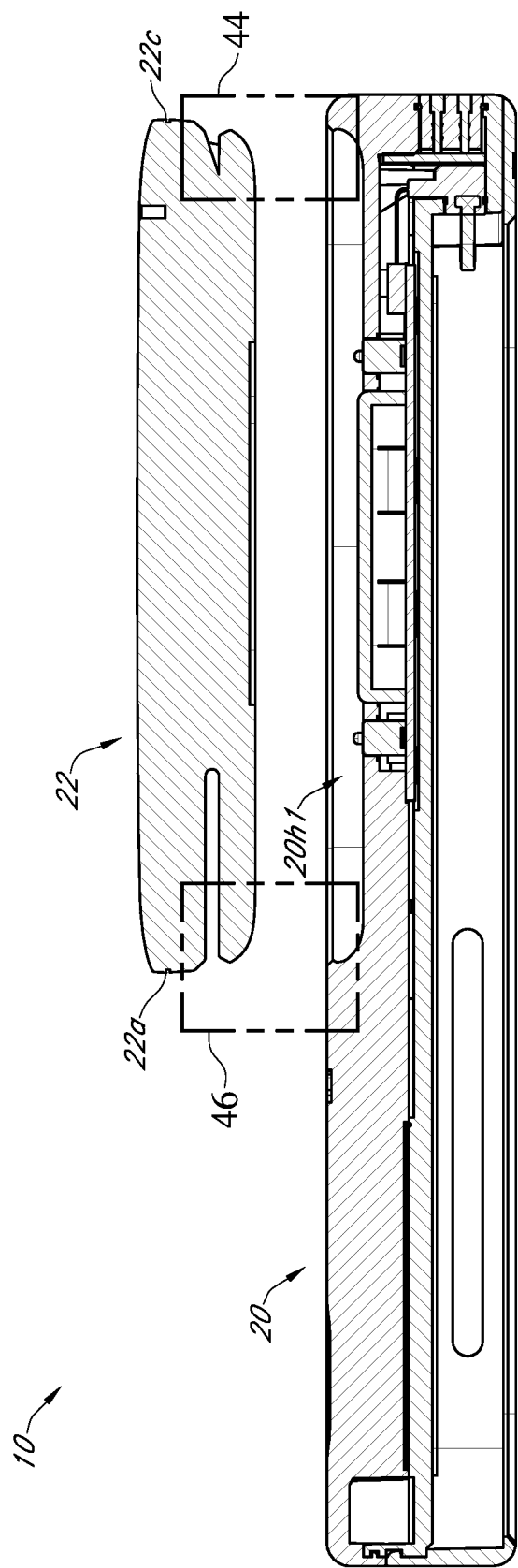
FIG. 42 is a side-elevational cross-sectional partially exploded view of case system 10.

Turning to FIG. 42, depicted therein is a side-elevational cross-sectional exploded view of case system 10.

Figure 43:
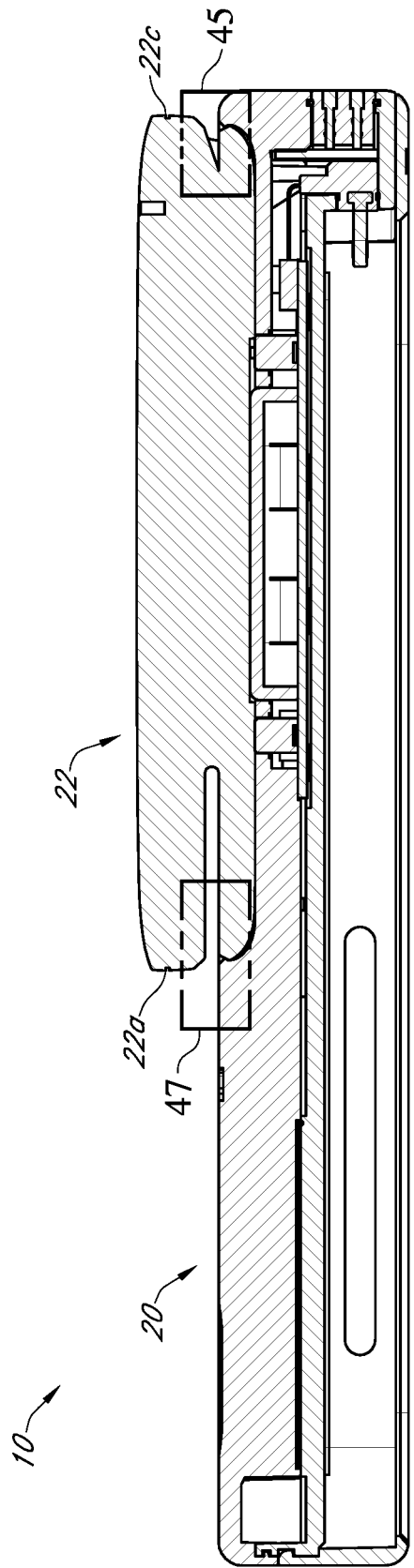
FIG. 43 is a side-elevational cross-sectional view of case system 10.

Turning to FIG. 43, depicted therein is a side-elevational cross-sectional view of case system 10. As depicted, when card reader 22 is coupled with rear assembly 20, insertion slot 22c1 (see FIG. 45) of card reader 22 and swipe slot 22a1 (see FIG. 47) of card reader 22 are positioned an elevational distance from base 20h 1e of recess 20h1 by the depth of recess 20h1.

Figure 44:
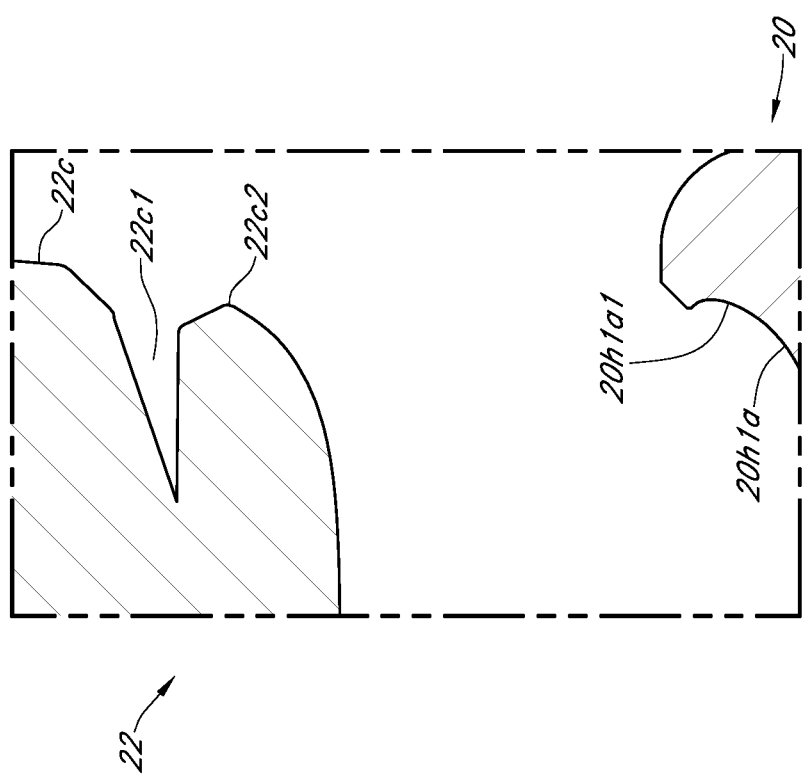
FIG. 44 is an enlarged side-elevational cross-sectional exploded partial view of case system 10.

Turning to FIG. 44, depicted therein is an enlarged side-elevational cross-sectional exploded partial view of case system 10. Depicted implementation of side 20h1a is shown to include lip protrusion 20h1a1, which is couplable with card reader 22.

Figure 45:
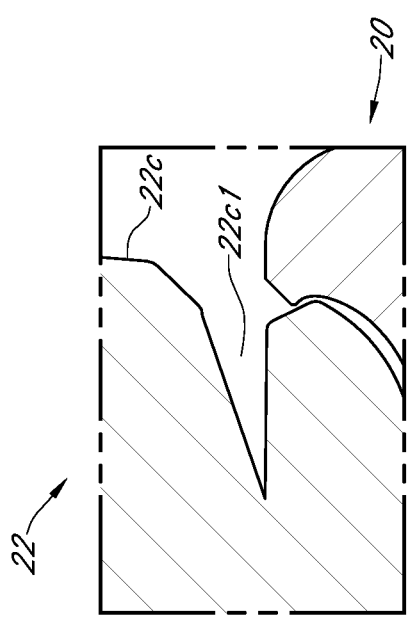
FIG. 45 is an enlarged side-elevational cross-sectional partial view of case system 10

Turning to FIG. 45, depicted therein is an enlarged side-elevational cross-sectional partial view of case system 10.

Figure 46:
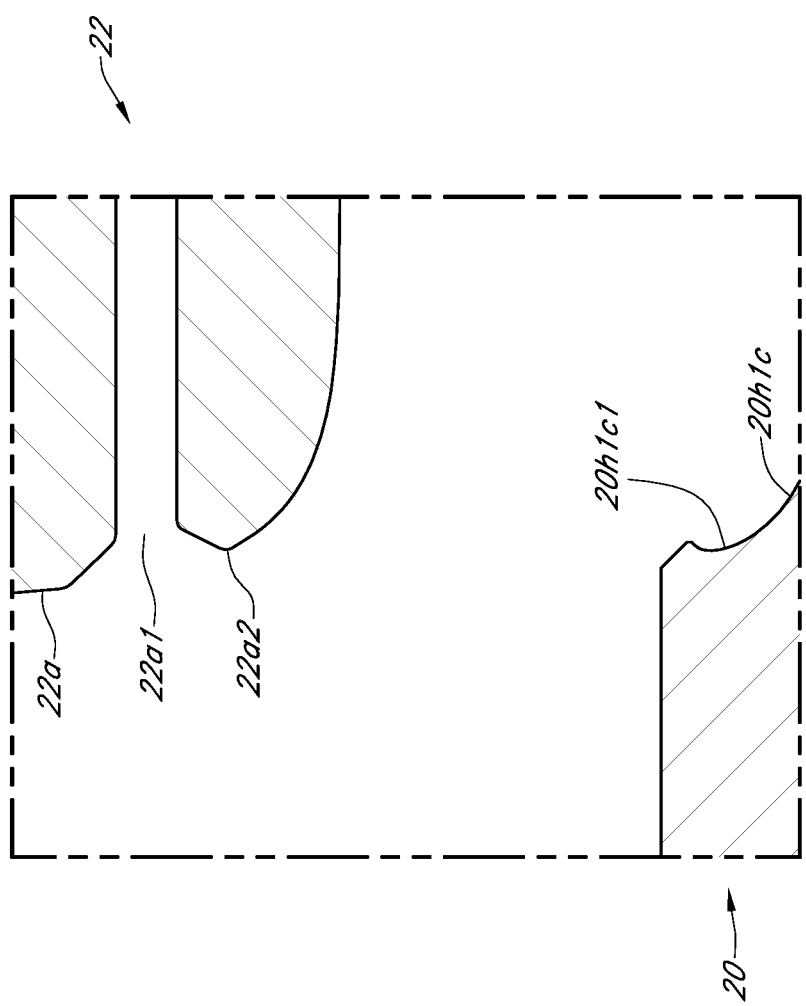
FIG. 46 is an enlarged side-elevational cross-sectional exploded partial view of case system 10.

Turning to FIG. 46, depicted therein is an enlarged side-elevational cross-sectional exploded partial view of case system 10. Depicted implementation of side 20h 1c is shown to include lip protrusion 20h 1c1, which is couplable with card reader 22.

Figure 47:
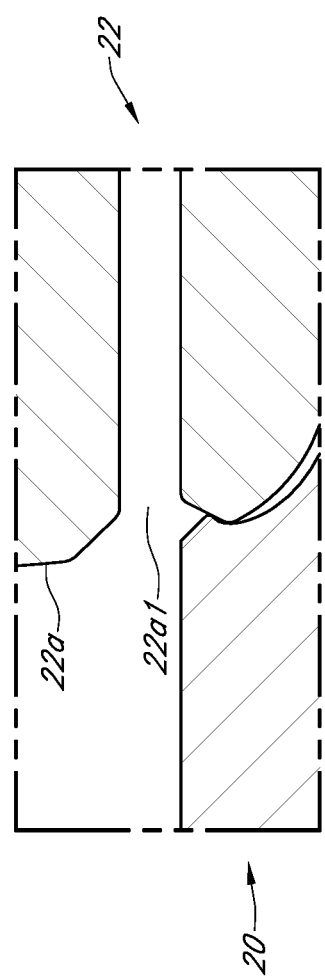
FIG. 47 is an enlarged side-elevational cross-sectional partial view of case system 10.

Turning to FIG. 47, depicted therein is an enlarged side-elevational cross-sectional partial view of case system 10.

Figure 48:
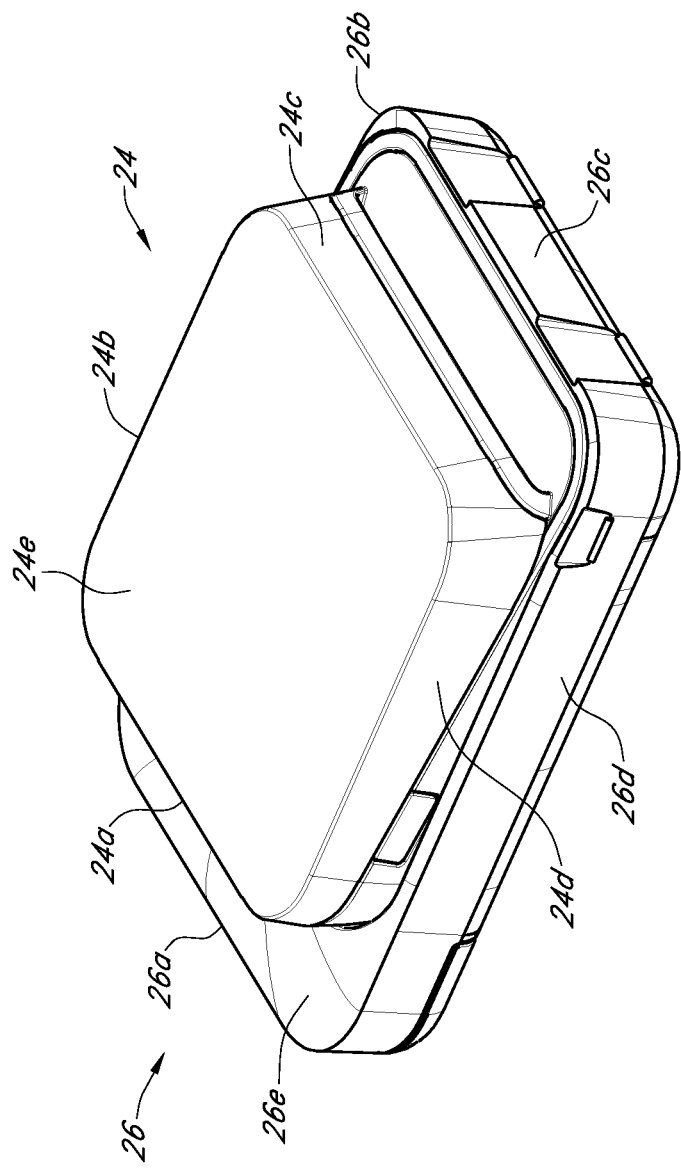
FIG. 48 is a top perspective view of adapter coupled with alternative card reader 22.

Turning to FIG. 48, depicted therein is a top perspective view of adapter 26 coupled with alternative card reader 24. Depicted implementation of alternative card reader 24 is shown to include side 24a, side 24b, side 24c, side 24d, and exterior upper 24e. Depicted implementation of adapter 26 is shown to include side 26a, side 26b, side 26c, side 26d, and exterior upper 26e.

Figure 49:
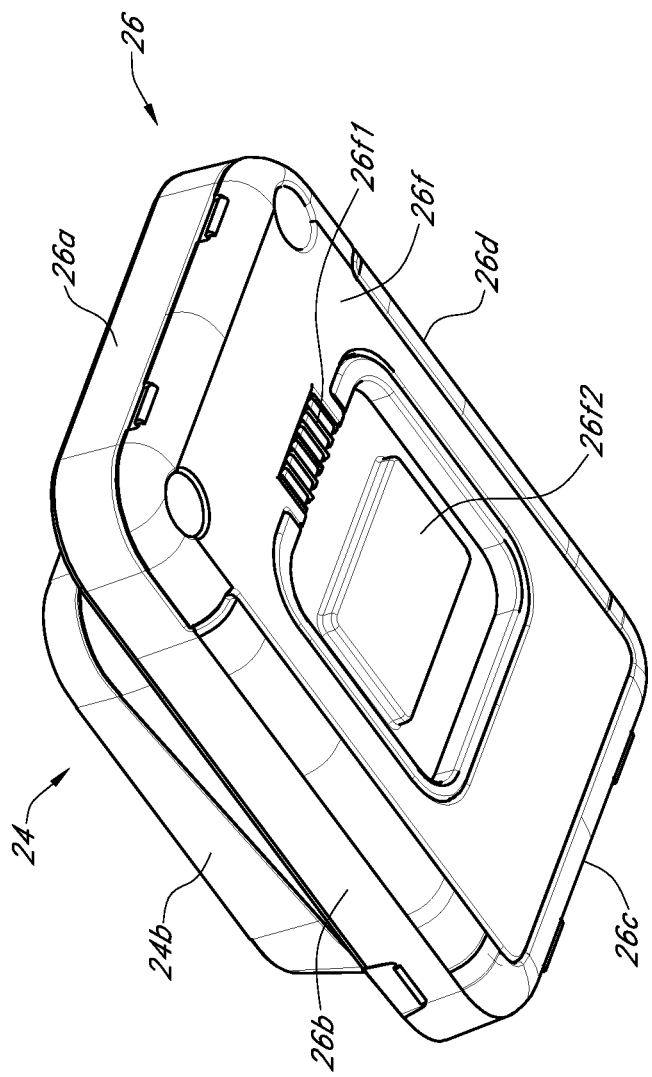
FIG. 49 is a bottom perspective view of adapter coupled with alternative card reader 22.

Turning to FIG. 49, depicted therein is a bottom perspective view of adapter 26 coupled with alternative card reader 24. Depicted implementation of adapter 26 is shown to include exterior lower 26f with electrical contacts 26f1 and magnetic portion 26f2.

Figure 50:
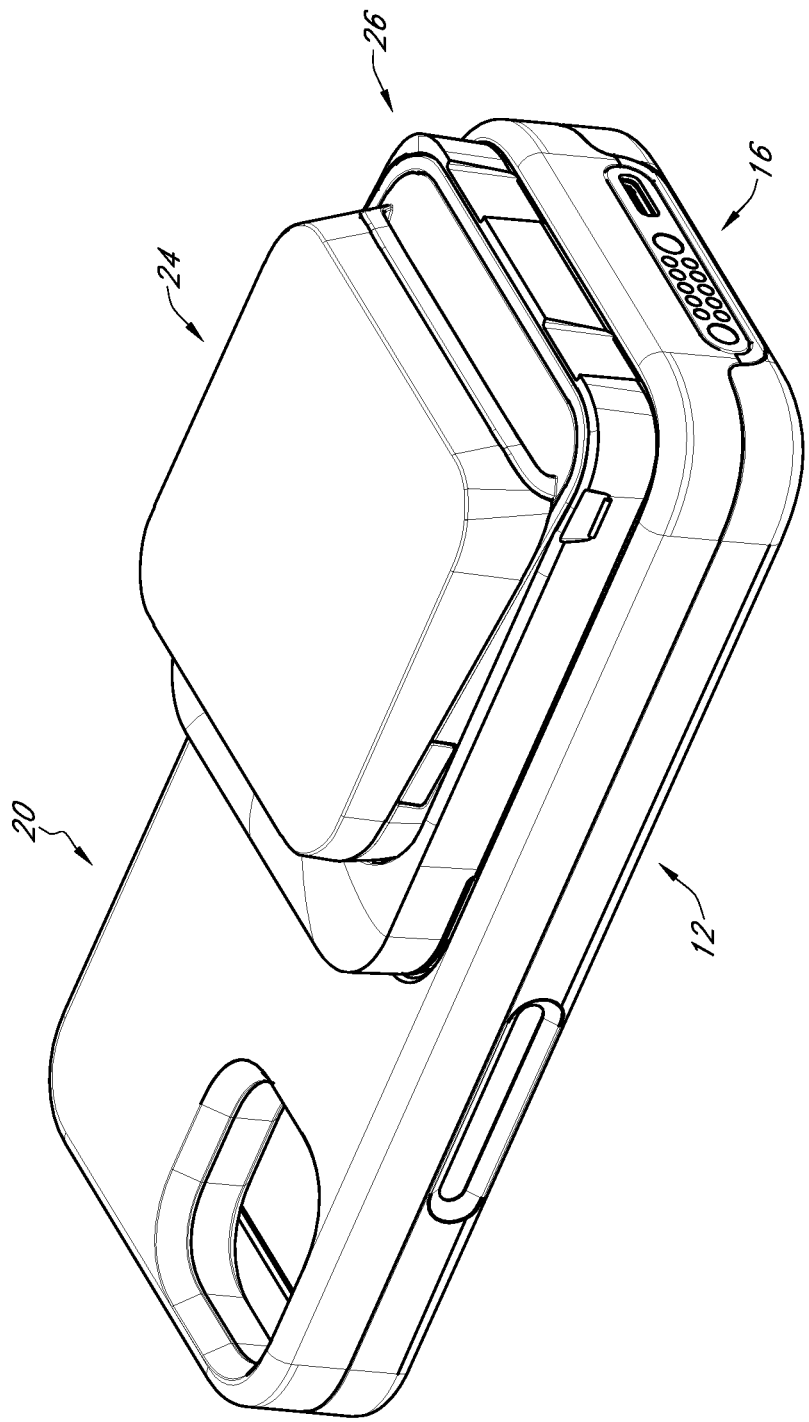
FIG. 50 is a top perspective view of alternative card reader coupled with adapter coupled with case system 10.

Turning to FIG. 50, depicted therein is a top perspective view of alternative card reader 24 coupled with adapter 26 coupled with case system 10.

Figure 51:
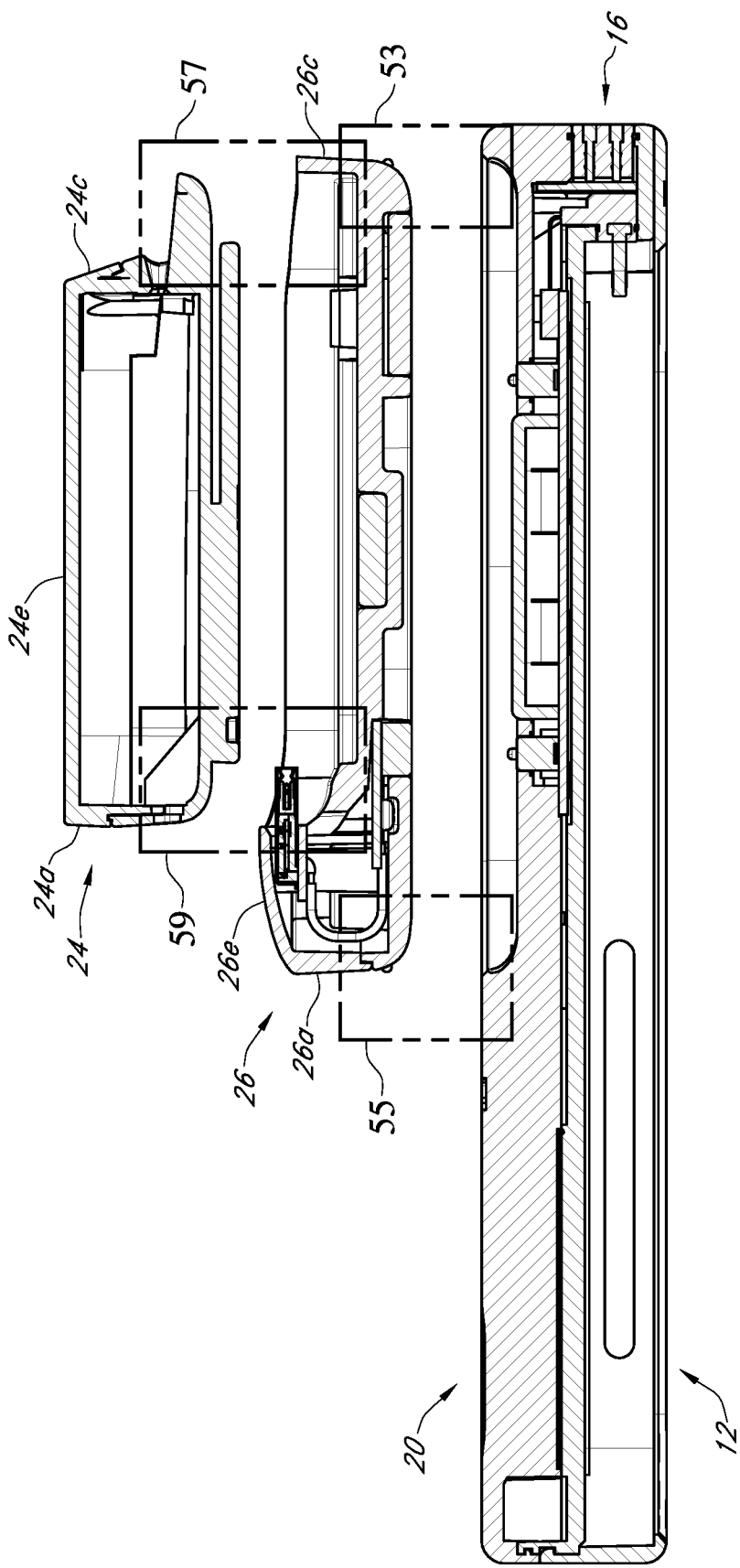
FIG. 51 is a side-elevational cross-sectional exploded view of alternative card reader uncoupled from adapter uncoupled from case system.

Turning to FIG. 51, depicted therein is a side-elevational cross-sectional exploded view of alternative card reader 24 uncoupled from adapter 26 uncoupled from case system 10.

Figure 52:
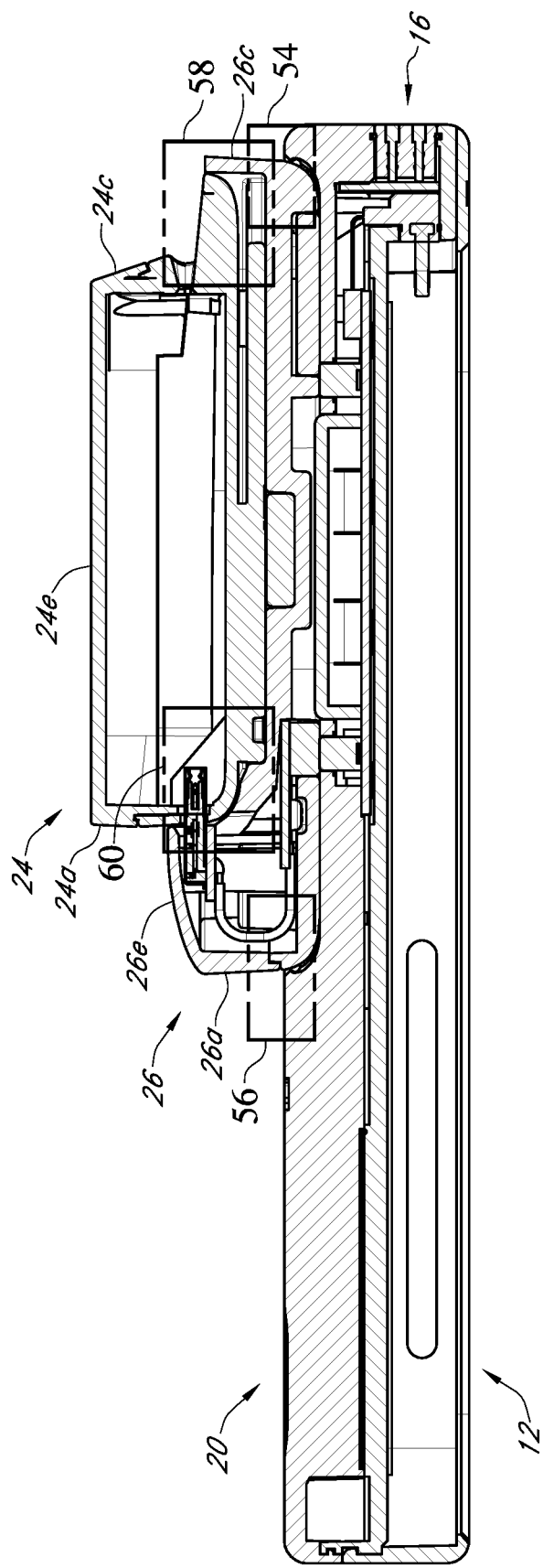
FIG. 52 is a side-elevational cross-sectional view of alternative card reader coupled with adapter coupled with case system.

Turning to FIG. 52, depicted therein is a side-elevational cross-sectional view of alternative card reader 24 coupled with adapter 26 coupled with case system 10.

Figure 53:
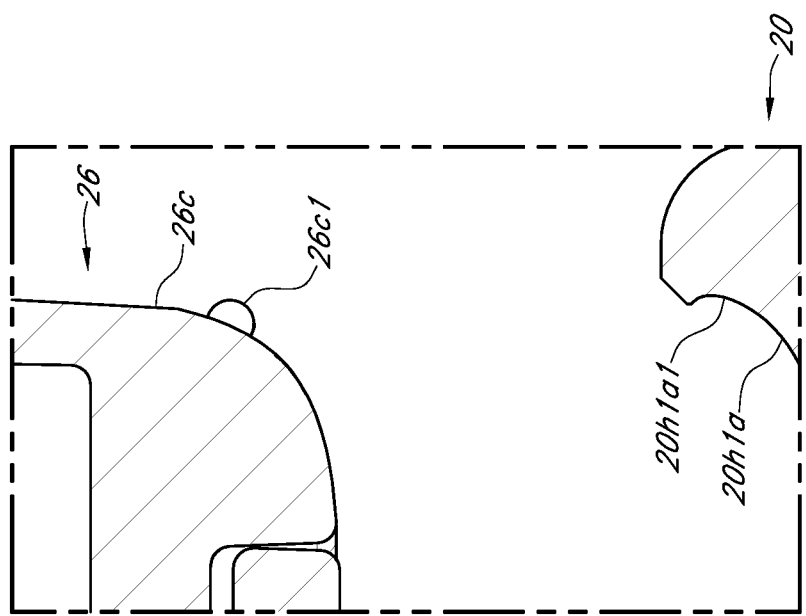
FIG. 53 is an enlarged side-elevational cross-sectional exploded partial view of case system 10 from adapter.

Turning to FIG. 53, depicted therein is an enlarged side-elevational cross-sectional exploded partial view of case system 10 uncoupled from adapter 26. Depicted implementation of side 26c is shown to include protrusion 26c1.

Figure 54:
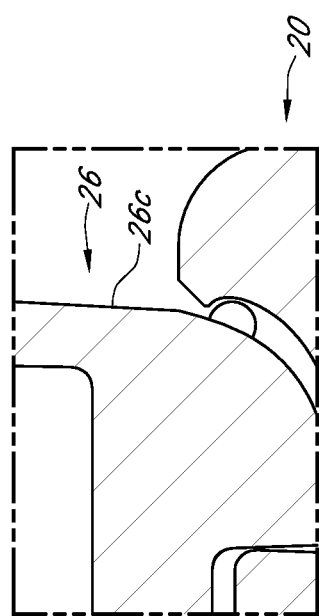
FIG. 54 is an enlarged side-elevational cross-sectional exploded partial view of case system 10 with adapter.

Turning to FIG. 54, depicted therein is an enlarged side-elevational cross-sectional exploded partial view of case system 10 coupled with adapter 26 including protrusion 26c1 of adapter 26 coupled with lip protrusion 20h1a1 of rear assembly 20

Figure 55:
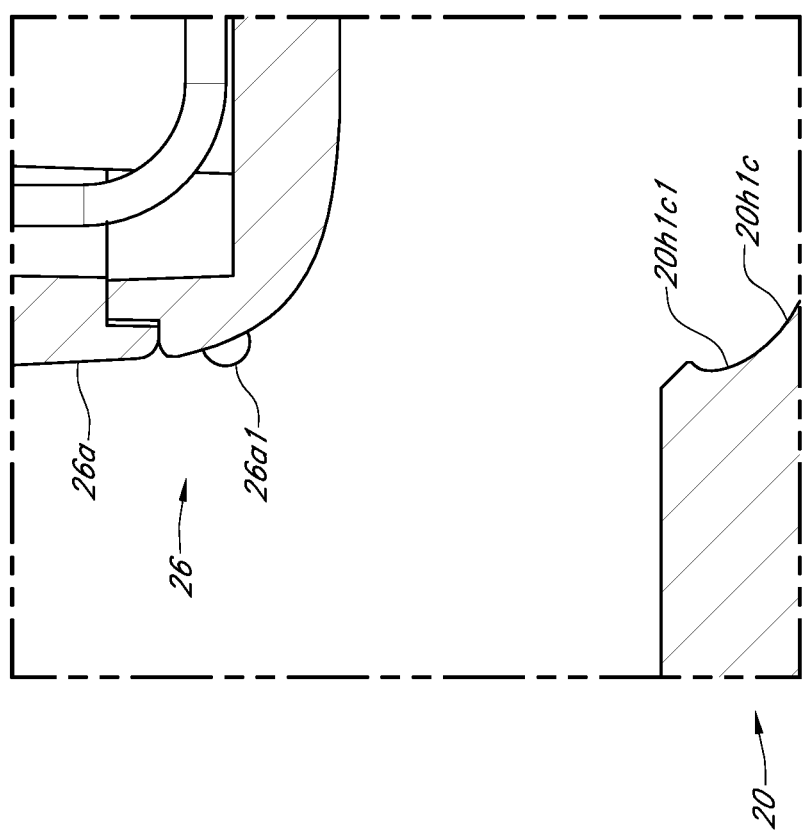
FIG. 55 is an enlarged side-elevational cross-sectional exploded partial view of case system 10 from adapter.

Turning to FIG. 55, depicted therein is an enlarged side-elevational cross-sectional exploded partial view of case system 10 uncoupled from adapter 26. Depicted implementation of side 26a is shown to include protrusion 26a1.

Figure 56:
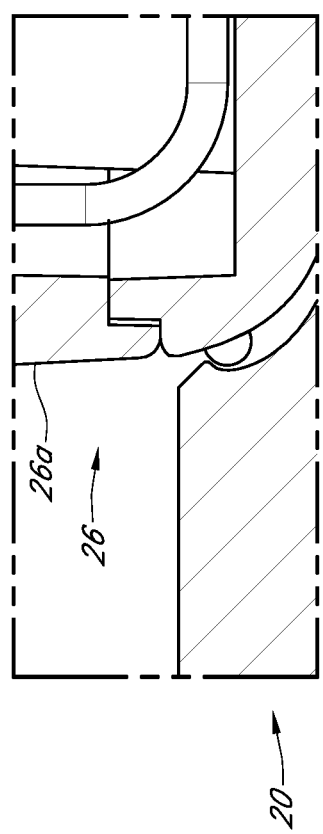
FIG. 56 is an enlarged side-elevational cross-sectional exploded partial view of case system 10 with adapter.

Turning to FIG. 56, depicted therein is an enlarged side-elevational cross-sectional exploded partial view of case system 10 coupled with adapter 26 including protrusion 26a1 of adapter 26 coupled with lip protrusion 20h1c1 of rear assembly 20

Figure 57:
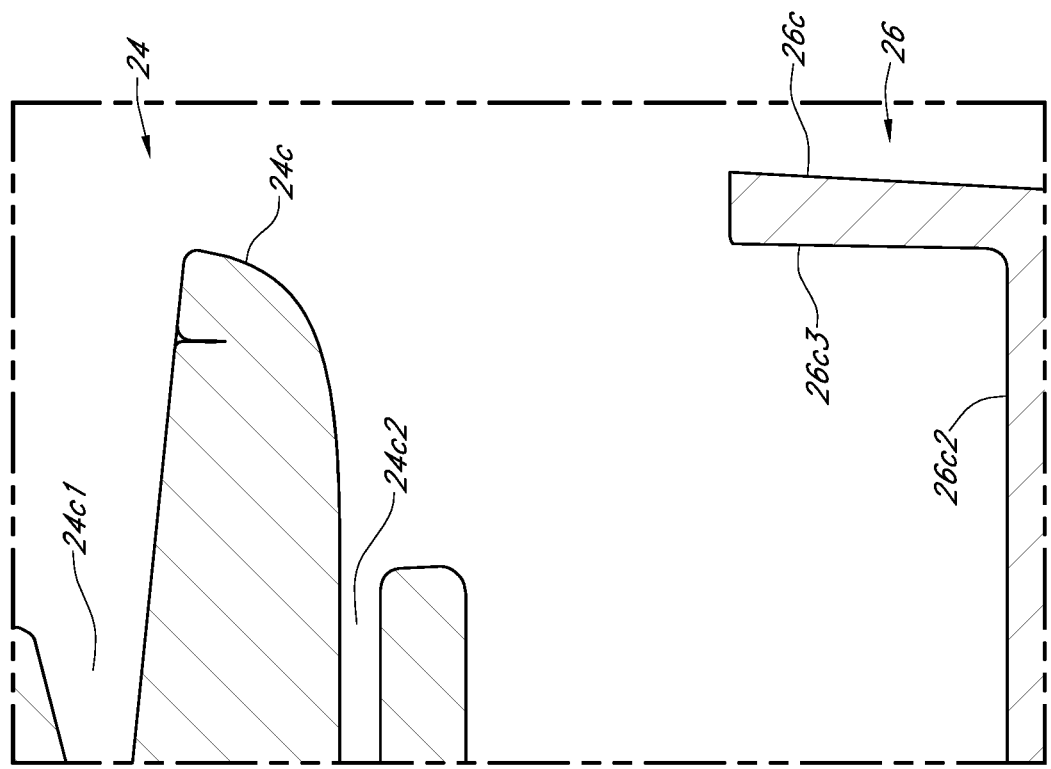
FIG. 57 is a side-elevational cross-sectional view of alternative card reader uncoupled from adapter.

Turning to FIG. 57, depicted therein is a side-elevational cross-sectional view of alternative card reader 24 uncoupled from adapter 26. Depicted implementation of side 24c is shown to include insert slot 24c1 and. Depicted implementation of side 26c is shown to include base 26c2 and side 26c3.

Figure 58:
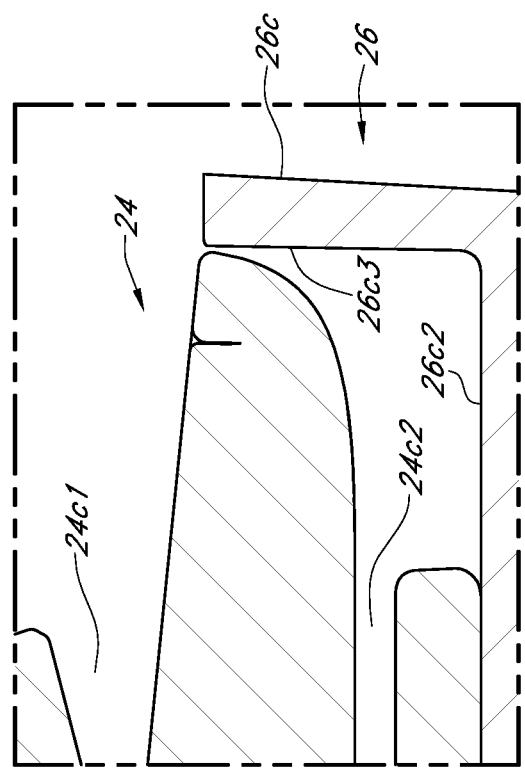
FIG. 58 is a side-elevational cross-sectional view of alternative card reader coupled with adapter.

Turning to FIG. 58, depicted therein is a side-elevational cross-sectional view of alternative card reader 24 coupled with adapter 26 including side 26c of adapter 26 coupled with side 24c of alternative card reader 24. As depicted, when alternative card reader 24 is coupled with adapter 26, a portion of insert slot 24c1 of alternative card reader 24 is positioned an elevational distance from base 26c2 of adapter 26 by the depth of side 26c3.

Figure 59:
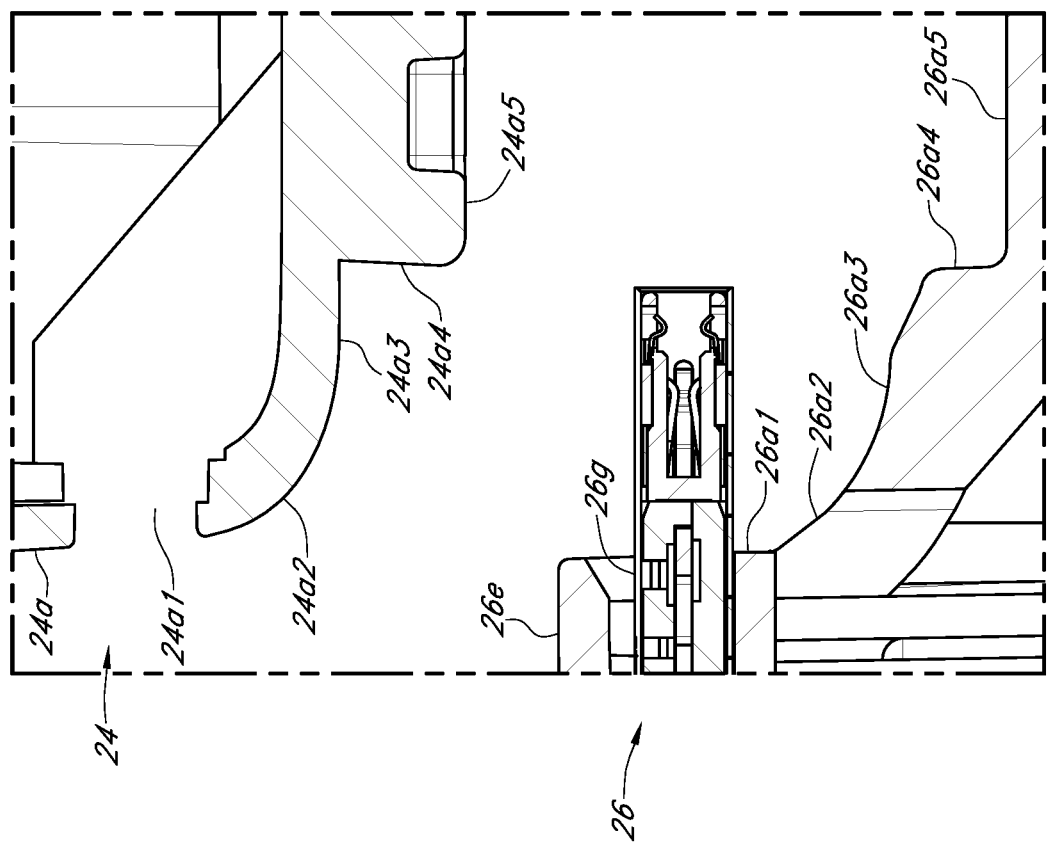
FIG. 59 is a side-elevational cross-sectional view of alternative card reader uncoupled from adapter.

Turning to FIG. 59, depicted therein is a side-elevational cross-sectional view of alternative card reader 24 uncoupled from adapter 26. Depicted implementation of side 24a is shown to include aperture 24a1, exterior portion 24a2, exterior portion 24a3, exterior portion 24a4, and exterior portion 24a5. Depicted implementation of side 26a is shown to include protrusion 26a1, interior portion 26a2, interior portion 26a3, interior portion 26a4, and interior portion 26a5. Depicted implementation of adapter 26 is shown to include electrical connector 26g.

Figure 60:
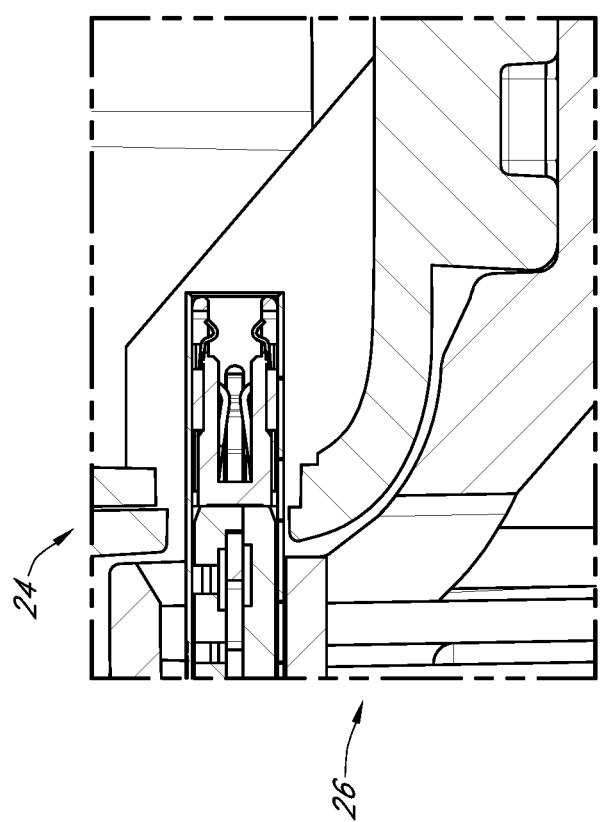
FIG. 60 is a side-elevational cross-sectional view of alternative card reader coupled with adapter.

Turning to FIG. 60, depicted therein is a side-elevational cross-sectional view of alternative card reader 24 coupled with adapter 26 including side 26a of adapter 26 coupled with side 24a of alternative card reader 24.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case system for a portable electronic device, the case system comprising:
   (I) a front assembly including
      (A) a first side,
      (B) a second side,
      (C) a third side,
      (D) a fourth side, and
      (E) a base extending perpendicular to and extending between the first side, the second side, the third side, and the fourth side,
      wherein at least a portion of the first side extends parallel to at least a portion of the second side,
      wherein at least a portion of the third side extends parallel to at least a portion of the fourth side, and
      wherein at least the portion of the first side extends perpendicular to the at least a portion of the third side;
   (II) a rear assembly coupled to the front assembly, the rear assembly including
      (A) a first side
      (B) a second side,
      (C) a third side,
      (D) a fourth side, and
      (E) a base extending perpendicular to and extending between the first side, the second side, the third side, and the fourth side,
      wherein the base includes an interior side facing the front assembly and an exterior side facing away from the front assembly,
      wherein at least a portion of the first side extends parallel to at least a portion of the second side,
      wherein at least a portion of the third side extends parallel to at least a portion of the fourth side, and
      wherein at least the portion of the first side extends perpendicular to the at least a portion of the third side;
   (III) a first electrical connector assembly coupled with the base of the rear assembly,
      wherein the first electrical connector assembly includes a first plurality of electrical contacts positioned in a spatial arrangement, wherein the first plurality of electrical contacts is accessible from the exterior side of the base of the rear assembly, wherein the first plurality of electrical contacts includes an electrical contact nearest to the at least a portion of the first side of the rear assembly, wherein the electrical contact of the first plurality of electrical contacts nearest to the at least a portion of the first side of the rear assembly is spaced from the at least a portion of the first side of the rear assembly a first distance, wherein the first plurality of electrical contacts includes an electrical contact nearest to the at least a portion of the second side of the rear assembly, wherein the electrical contact of the first plurality of electrical contacts nearest to the at least a portion of the second side of the rear assembly is spaced from the at least a portion of the second side a second distance; and (IV) a second electrical connector assembly coupled with the base of the rear assembly, wherein the second electrical connector assembly includes a second plurality of electrical contacts positioned in a spatial arrangement, wherein the second plurality of electrical contacts is accessible from the exterior side of the base of the rear assembly, wherein the second plurality of electrical contacts includes an electrical contact nearest to the at least a portion of the first side of the rear assembly, wherein the electrical contact of the second plurality of electrical contacts nearest to the at least a portion of the first side of the rear assembly is spaced from the at least a portion of the first side of the rear assembly a first distance, wherein the second plurality of electrical contacts includes an electrical contact nearest to the at least a portion of the second side of the rear assembly, wherein the electrical contact of the second plurality of electrical contacts nearest to the at least a portion of the second side of the rear assembly is spaced from the at least a portion of the second side of the rear assembly a second distance, wherein in the first distance of the first electrical connector assembly is equal to the first distance of the second electrical connector assembly, wherein the second distance of the first electrical connector assembly is equal to the second distance of the second electrical connector assembly, and wherein the spatial arrangement of the second electrical connector assembly is a duplicate of the spatial arrangement of the first electrical connector assembly.

2. The case system of claim 1 further including a third electrical connector assembly, wherein the rear assembly and the front assembly couple to form an opening sized to couple with the third electrical connector assembly.

3. The case system of claim 1
wherein the base of the rear assembly includes a first aperture to receive the first electrical connector assembly, wherein a portion of the first electrical connector assembly protrudes through the first aperture from the interior side of the base to the exterior side of the base thereby providing accessibility to the plurality of electrical contacts of the first electrical connector assembly from the exterior side of the base, wherein the base of the rear assembly includes a second aperture to receive the second electrical connector assembly, and wherein a portion of the second electrical connector assembly protrudes through the second aperture from the interior side of the base to the exterior side of the base thereby providing accessibility to the plurality of electrical contacts of the second electrical connector assembly from the exterior side of the base.

4. The case system of claim 3
wherein the exterior side of the base of the rear assembly includes a recess.

5. The case system of claim 4
wherein the recess includes a base and a depth,
wherein the exterior side of the base of the rear assembly includes a first portion and a second portion extending in parallel with respect to one another and differing in elevation by a first elevational difference,
wherein the base of the recess is the first portion of the exterior side of the base,
wherein the first elevational difference is the depth of the recess, and
wherein the base of the recess includes the first aperture and the second aperture.

6. The case system of claim 5
wherein the recess includes a first side,
wherein the recess includes a second side,
wherein the first side and the second side of the recess extend parallel with respect to one another,
wherein the first aperture and the second aperture of the base of the rear assembly are equally spaced from the first side of the recess, and
wherein the first aperture and the second aperture of the base of the rear assembly are equally spaced from the second side of the recess.

7. The case system of claim 6
wherein the rear assembly includes a metal plate,
wherein the metal plate is coupled to the base of the rear assembly,
wherein the base of the recess includes a third aperture, and
wherein a portion of the metal plate protrudes through the third aperture from the interior side of the base of the rear assembly to the base of the recess thereby providing accessibility to the metal plate from the exterior side of the base of the rear assembly.

8. The case system of claim 7
wherein the third aperture of the base of the recess includes a first side and a second side extending parallel with one another,
wherein the first plurality of electrical contacts of the first electrical connector assembly includes an electrical contact nearest to the first side of the third aperture,
wherein the electrical contact of the first plurality of electrical contacts of the first electrical connector assembly nearest to the first side of the third aperture is spaced from the first side of the recess a first distance,
wherein the second plurality of electrical contacts of the second electrical connector assembly includes an electrical contact nearest to the second side of the third aperture, and
wherein the electrical contact of the second plurality of electrical contacts of the second electrical connector assembly nearest to the second side of the third aperture is spaced from the second side of the third aperture a second distance equal to the first distance.

9. The case system of claim 6
wherein the recess includes at least one first lip protrusion extending from the first side of the recess, and
wherein the recess includes at least one second lip protrusion extending from the second side of the recess.

10. The case system of claim 9 further including a card reader including a base and at least one slot,
wherein the card reader is couplable with the at least one first lip protrusion and the at least one second lip protrusion of the recess,
wherein the at least one slot of the card reader extends in parallel with respect to the base of the card reader,
wherein the at least one slot of the card reader is positioned a first elevational distance from base of the card reader, and
wherein the depth of the recess of the rear assembly is equal to the first elevational distance.

11. The case system of claim 9 further including an adapter sized and shaped to engage the at least one of lip protrusion extending from the first side of the recess and to engage the at least one of lip protrusion extending from the second side of the recess.

12. The case system of claim 11 further including a card reader wherein the adapter is sized and shaped to couple with the card reader.

13. The case system of claim 12
wherein the card reader includes a base and at least one slot,
wherein the adapter includes a base positioned a first elevational distance from the at least one slot of the card reader when the adapter is coupled with the card reader, and
wherein the depth of the recess of the rear assembly is equal to the first elevational distance.

14. The case system of claim 9 further including a card reader couplable to the rear assembly,
wherein the card reader is electrically coupled with the first electrical connector assembly when the card reader is coupled to the rear assembly in a first position,
wherein the card reader is electrically coupled with the second electrical connector assembly when the card reader is coupled to the rear assembly in a second position, and
wherein the carder reader is rotationally oriented in the second position 180 degrees from the first position.

15. A case system for a portable electronic device, the case system comprising:
(I) a front assembly;
(II) a rear assembly coupled to the front assembly, the rear assembly including
(A) a base including an edge, an interior side facing the front assembly and an exterior side facing away from the front assembly;
(III) a first electrical connector assembly coupled with the base of the rear assembly,
wherein the first electrical connector assembly includes a first plurality of electrical contacts positioned in a spatial arrangement, and
wherein the first plurality of electrical contacts is accessible from the exterior side of the base; and
(IV) a second electrical connector assembly coupled with the base of the rear assembly,
wherein the second electrical connector assembly includes a second plurality of electrical contacts positioned in a spatial arrangement,
wherein the second plurality of electrical contacts is accessible from the exterior side of the base,
wherein the spatial arrangement of the second electrical connector assembly is a duplicate of the spatial arrangement of the first electrical connector assembly, and
wherein the first electrical connector assembly and the second electrical connector assembly are spaced from the edge of the base a first distance.

16. The case system of claim 15
wherein the exterior side of the base of the rear assembly includes a recess,
wherein the rear assembly includes a metal plate coupled to the base of the rear assembly and accessible from the exterior side of the base of the rear assembly, and
wherein from the exterior side of the base of the rear assembly the first electrical connector assembly and the second electrical connector assembly are equally spaced from opposite sides of the metal plate.

17. The case system of claim 16 further including a card reader including a base and at least one slot,
wherein the card reader is couplable with the recess,
wherein the at least one slot of the card reader extends in parallel with respect to the base of the card reader,
wherein the at least one slot of the card reader is positioned a first elevational distance from base of the card reader, and
wherein the depth of the recess of the rear assembly is equal to the first elevational distance.

18. A case system for a portable electronic device, the case system comprising:
(I) a rear assembly including
(A) a base including an edge and an exterior side;
(II) a first electrical connector assembly coupled with the base of the rear assembly and accessible from the exterior side of the base;
(III) a second electrical connector assembly coupled with the base of the rear assembly and accessible from the exterior side of the base, and
wherein the first electrical connector assembly and the second electrical connector assembly are spaced from the edge of the base a first distance;
(IV) a card reader; and
(V) an adapter,
wherein the adapter is sized and shaped to couple with the card reader,
wherein the exterior side of the base of the rear assembly includes a recess,
wherein the adapter is sized and shaped to couple with the recess having a depth,
wherein the card reader includes a base and at least one slot,
wherein the adapter includes a base positioned a first elevational distance from the at least one slot of the card reader when the adapter is coupled with the card reader, and
wherein the depth of the recess of the rear assembly is equal to the first elevational distance.

19. A case system for a portable electronic device, the case system comprising:
(I) a rear assembly including
(A) a base including an edge and an exterior side;
(II) a first electrical connector assembly coupled with the base of the rear assembly and accessible from the exterior side of the base;
(III) a second electrical connector assembly coupled with the base of the rear assembly and accessible from the exterior side of the base, and wherein the first electrical connector assembly and the second electrical connector assembly are spaced from the edge of the base a first distance; and (IV) a card reader couplable to the rear assembly, wherein the card reader is electrically coupled with the first electrical connector assembly when the card reader is coupled to the rear assembly in a first position, and wherein the card reader is electrically coupled with the second electrical connector assembly when the card reader is coupled to the rear assembly in a second position in which the carder reader is rotationally oriented in the second position 180 degrees from the first position.

* * * * *